United States Patent
Miyamoto et al.

(10) Patent No.: US 6,776,829 B2
(45) Date of Patent: Aug. 17, 2004

(54) WATER-BASED INK COMPOSITION FOR WRITING UTENSIL

(75) Inventors: Masaru Miyamoto, Kanagawa (JP);
Tadashi Kamagata, Kanagawa (JP);
Yoji Takeuchi, Kanagawa (JP); Shigeru Miyazaki, Kanagawa (JP)

(73) Assignee: Mitsubishi Pencil Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/297,063

(22) PCT Filed: Jun. 1, 2001

(86) PCT No.: PCT/JP01/04635
§ 371 (c)(1),
(2), (4) Date: Dec. 2, 2002

(87) PCT Pub. No.: WO01/92431
PCT Pub. Date: Dec. 6, 2001

(65) Prior Publication Data
US 2003/0196568 A1 Oct. 23, 2003

(30) Foreign Application Priority Data

| Jun. 1, 2000 | (JP) | 2000-164961 |
| Jun. 1, 2000 | (JP) | 2000-164963 |
| Jun. 1, 2000 | (JP) | 2000-164964 |
| Jun. 1, 2000 | (JP) | 2000-164965 |
| Jun. 1, 2000 | (JP) | 2000-164967 |
| Jun. 1, 2000 | (JP) | 2000-164968 |
| Jun. 1, 2000 | (JP) | 2000-164969 |
| Jun. 1, 2000 | (JP) | 2000-164970 |
| Jun. 1, 2000 | (JP) | 2000-164971 |
| Jun. 1, 2000 | (JP) | 2000-164972 |
| Jun. 1, 2000 | (JP) | 2000-164974 |
| Jun. 1, 2000 | (JP) | 2000-164975 |
| Jun. 1, 2000 | (JP) | 2000-164976 |
| Jun. 1, 2000 | (JP) | 2000-164977 |
| Jun. 1, 2000 | (JP) | 2000-164978 |
| Jun. 1, 2000 | (JP) | 2000-164979 |
| Jun. 1, 2000 | (JP) | 2000-164980 |

(51) Int. Cl.$^7$ .............................................. C09D 11/16
(52) U.S. Cl. ........................ 106/31.58; 106/31.59; 106/31.86; 106/31.89; 106/31.02; 106/31.43; 106/31.75

(58) Field of Search .................. 106/31.58, 31.59, 106/31.86, 31.89, 31.02, 31.43, 31.75

(56) References Cited

U.S. PATENT DOCUMENTS

| 5,616,174 A | * | 4/1997 | Kanaya et al. ............ 106/31.48 |
| 5,720,800 A | * | 2/1998 | Matsumoto ..................... 106/2 |
| 5,828,393 A | * | 10/1998 | Hotomi ........................ 347/71 |
| 6,261,352 B1 | * | 7/2001 | Asami ....................... 106/31.58 |
| 6,375,728 B2 | * | 4/2002 | Yamashita et al. .......... 106/31.6 |
| 6,390,710 B1 | * | 5/2002 | Miyamoto .................. 401/215 |
| 6,491,747 B2 | * | 12/2002 | Miyamoto et al. ....... 106/31.58 |

FOREIGN PATENT DOCUMENTS

| JP | 56-081377 A | 7/1981 |
| JP | 62-004764 A | 2/1987 |
| JP | 63-223078 A | 9/1988 |
| JP | 08-283645 A | 10/1996 |
| JP | 11-106781 A | 4/1999 |
| JP | 2000-248221 A | 9/2000 |
| JP | 2001-002973 A | 1/2001 |
| JP | 2001-040262 A | 2/2001 |
| JP | 2001-207099 A | 7/2001 |

* cited by examiner

Primary Examiner—Mark L. Bell
Assistant Examiner—Veronica F. Faison
(74) Attorney, Agent, or Firm—Burns, Doane, Swecker & Mathis, L.L.P.

(57) ABSTRACT

Provided is a water based ink composition for a writing instrument comprising at least one of nonionic surfactants comprising polyhydric alcohol fatty acid esters, ethylene oxide adducts of polyhydric alcohol fatty acid esters, ethylene oxide adducts of higher alcohols and alkylphenols, ethylene oxide and propylene oxide adducts of higher alcohols, ethylene oxide adducts of castor oil or hardened castor oil, ethylene oxide adducts of hardened castor oil fatty acid esters and ethylene oxide adducts of higher alkylamines and fatty acid amides and further comprising a colorant, a perfume and water. It is less liable to cause feathering of the lines and has durability of fragrance, in which a perfume is dispersed and retained in an aqueous medium in a stable state.

8 Claims, No Drawings

WATER-BASED INK COMPOSITION FOR WRITING UTENSIL

TECHNICAL FIELD

The present invention relates to a water based ink composition for a writing instrument characterized by shedding fragrance in writing and imparting faint fragrance as well to the drawn lines.

BACKGROUND ART

In general, a perfume is oil-soluble, and an emulsifier or a dispersant which forms a protective colloid is required in order to emulsify and disperse it in water. Water-soluble resins or surfactants are used as the protective colloid described above, and in the case of almost all water-soluble resins, use of a necessary and sufficient amount of a resin required for dispersing a perfume raises the liquid viscosity and makes it inadequate as an ink for a writing instrument.

On the other hand, an emulsion which is prepared using a surfactant in an amount sufficient for emulsifying a perfume in a stable state is reduced in the surface tension to a large extent, so that an ink prepared using the emulsion has a practical problem that the drawn lines are liable to cause feathering. Further an ink prepared by the mere emulsifying and dispersing of a perfume by the method described above provides the problem that fragrance is shed immediately after writing but the fragrance is lost soon thereafter and can not be maintained for a long time (no durability).

Those which have so far been known as ink compositions for a writing instrument containing a perfume shedding fragrance in writing include, for example, inks for a ball-point pen comprising dyes, resins and organic solvents, wherein a perfume having a compatibility with the above ink is added (Japanese Patent Application Laid-Open No. 81377/1981), perfume-containing, water based inks which are blended with a perfume, maltosylcyclodextorin (MCD), a colorant and water (Japanese Patent Application Laid-Open No. 223078/1988) and water based ink compositions for a writing instrument which comprise a colorant, a perfume, a partially sulfonated polyester resin and water (Japanese Patent Application Laid-Open No. 283645/1996).

However, the ink composition described in Japanese Patent Application Laid-Open No. 81377/1981 described above has a problem that feathering is caused on a paper surface in writing even if a perfume having a compatibility with the ink is added. Further, in the ink composition described in Japanese Patent Application Laid-Open No. 223078/1988 described above, the perfume is included in MCD, and the above inclusion compound is added to the water based ink. Accordingly, the perfume contained in this water based ink tends to easily be separated with the passage of time, particularly with the passage of time at a high temperature, so that the ink composition involves problems in dispersibility of the perfume and durability of fragrance. Further, the ink composition disclosed in Japanese Patent Application Laid-Open No. 283645/1996 involves the problem that fragrance is shed immediately after writing but the fragrance is lost thereafter and can not be retained for long time (no durability).

In light of the problems on the conventional techniques described above, the present invention intends to solve them, and an object thereof is to provide a water based ink composition for a writing instrument which is less liable to cause feathering of the lines and has durability of fragrance and in which a perfume is dispersed and retained in an aqueous medium in a stable state.

DISCLOSURE OF THE INVENTION

Intensive researches conducted by the present inventors regarding the problems of the conventional techniques described above have resulted in successfully obtaining a water based ink composition for a writing instrument which meets the object described above by adding a specific ink component to a water based ink composition for a writing instrument comprising a colorant and a perfume, and thus the present invention has been completed.

That is, the water based ink composition for a writing instrument of the present invention is characterized by comprising a colorant, a perfume and water in combination with at least one specific nonionic surfactant.

Used as the nonionic surfactant is at least one selected from polyhydric alcohol type nonionic surfactants, polyethylene glycol type nonionic surfactants, castor oil base nonionic surfactants and ethylene oxide adducts of alkylamine and alkylamide.

BEST MODE FOR CARRYING OUT THE INVENTION

The water based ink composition for a writing instrument of the present invention comprises a colorant, a perfume and water in combination with at least one specific nonionic surfactant.

The nonionic surfactant used in the present invention is used for the purposes of a feathering inhibitor, a fragrance durability-improving agent and inhibiting separation of the perfume and includes the following ones.
(1) Polyhydric alcohol type nonionic surfactants:
   polyhydric alcohol fatty acid esters
(2) Polyethylene glycol type nonionic surfactants:
   ethylene oxide adducts of polyhydric alcohol fatty acid esters, ethylene oxide adducts of higher alcohols and alkylphenols and ethylene oxide and propylene oxide adducts of higher alcohols
(3) Castor oil type nonionic surfactants:
   ethylene oxide adducts of castor oil or hardened castor oil and ethylene oxide adducts of hardened castor oil fatty acid esters
(4) Ethylene oxide adducts of alkylamines and alkylamides:
   ethylene oxide adducts of higher alkylamines and fatty acid amides.

To be more specific,
(1) used as the polyhydric alcohol type nonionic surfactants are polyhydric alcohol fatty acid esters such as sucrose fatty acid esters, sorbitan fatty acid esters, polyglycerin fatty acid esters and propylene glycol fatty acid esters,
(2) used as the polyethylene glycol type nonionic surfactants are polyoxyethylene adducts of polyhydric alcohol fatty acid esters, such as polyoxyethylene trimethylolpropane fatty acid esters, polyoxyethylene glycerin fatty acid esters, polyoxyethylene sorbit fatty acid esters and polyoxyethylene sorbitan fatty acid esters, ethylene oxide adducts of alkylphenols, higher alcohols, cholesterol, lanolin alcohol and polypropylene glycol, and ethylene oxide and propylene oxide adducts of higher alcohols,
(3) used as the castor oil type nonionic surfactants are ethylene adducts of castor oil or hardened castor oil and fatty acid esters of polyoxyethylene hardened castor oil, and
(4) used as the ethylene oxide adducts of alkylamines and alkylamides are ethylene oxide adducts of higher alkylamines and fatty acid amides.

Next, the foregoing nonionic surfactants used in the present invention shall specifically be explained.

(1) Polyhydric Alcohol Fatty Acid Esters

The sucrose fatty acid ester used in the present invention is obtained by esterifying at least one of 8 hydroxyl groups present in sucrose with a fatty acid, and it is a surfactant in which a sucrose part is a hydrophilic group and in which a fatty acid part is a lipophilic group. The sucrose fatty acid ester can be controlled in a surface tension and an interfacial tension by the number of fatty acids bonded to sucrose or a molecular weight of fatty acids bonded thereto, and it has excellent solubility, emulsifiability and dispersibility. In the present invention, all publicly known sucrose fatty acid esters can be used as long as the characteristics of the ink composition are not damaged, and they can be blended not only alone but also in combination of two or more different kinds thereof.

Capable of being given as the examples of the preferred commercial products of the sucrose fatty acid esters are DK Ester F-160, F-140, F-110, F-90, F-70 and F-50 manufactured by Daiichi Kogyo Seiyaku Co., Ltd., Sunsoft SE-16P, SE-16, SE-11 and SE-7 manufactured by Taiyo Kagaku Co., Ltd., and Ryoto Sugar Ester S-070, S-170, S-270, S-370, S-570, S-970, S-1570, P-070, P-170, P-1570, M-1695, O-170, O-1570, OWA-1570, L-195, L-595, LWA-1570, B-370, ER-190, ER-290 and POS-135 manufactured by Mitsubishi Kagaku Foods Corporation.

The sorbitan fatty acid ester is a compound-obtained by esterifying a fatty acid with sorbitan which is produced by dehydrating sorbitol with heating, and the specific solubility, emulsifiability and dispersibility can be exhibited by selecting the kind of the fatty acid.

The specific examples of the commercial products include SS-10 (Nikko Chemicals Co., Ltd.), SP-60R(NOF Corporation.), Rheodol SP-S10, AS-10 and Emasol S-10 (Kao Corporation), Newcol 60 (Nippon Nyukazai Co., Ltd.), Sunsoft No. 61S, No. 61NN and No. 67 (Taiyo Kagaku Co., Ltd.) and Emalex SPE-100S (Nihon Emulsion Co., Ltd.) each comprising stearic acid monoester, Sunsoft No. 63C (Taiyo Kagaku Co., Ltd.) and Emasol S-20 (Kao Corporation) each comprising stearic acid diester, SS-15 (Nikko Chemicals Co., Ltd.) and Emalex SPE-150S (Nihon Emulsion Co., Ltd.): each comprising stearic acid sesquiester, SS-30 (Nikko Chemicals Co., Ltd.), Rheodol SP-S30 and Emasol S-30 (Kao Corporation) and Sunsoft No. 65T (Taiyo Kagaku Co., Ltd.) each comprising stearic acid triester, SI-10R (Nikko Chemicals Co., Ltd.), Kuril 6 (Croda Japan K.K.) and Emalex SPIS-100 (Nihon Emulsion Co., Ltd.) each comprising isostearic acid monoester, SI-15R (Nikko Chemicals Co., Ltd.) and Emalex SPIS-150 (Nihon Emulsion Co., Ltd.) each comprising isostearic acid sesquiester, SO-10 and SO-10R (Nikko Chemicals Co., Ltd.), Nonion OP-80R(NOF Corporation.), Rheodol SP-O10, AO-10 and Emasol 0-10(F) (Kao Corporation), Newcol 80 (Nippon Nyukazai Co., Ltd.), Emalex SPO-100 (Nihon Emulsion Co., Ltd.) and Sunsoft No. 81S and No. 87N (Taiyo Kagaku Co., Ltd.) each comprising oleic acid monoester, SO-15, SO-15R and SO-15EX (Nikko Chemicals Co., Ltd.), Nonion OP-83RAT (NOF Corporation.), Rheodol AO-15 and Emasol 0-15R (Kao Corporation), Emalex SPO-150 (Nihon Emulsion Co., Ltd.) and Sorgen 30 and S-39-H (Daiichi Kogyo Seiyaku Co., Ltd.) each comprising oleic acid sesquiester, SO-30 and SO-30R (Nikko Chemicals Co., Ltd.), Nonion OP-85R(NOF Corporation.), Rheodol SP-O30 and Emasol O-30 (Kao Corporation), Sunsoft No. 85T (Taiyo Kagaku Co., Ltd.) and Newcol 13-80 (Nippon Nyukazai Co., Ltd.) each comprising oleic acid triester, SL-10 (Nikko Chemicals Co., Ltd.), Nonion LP-20R (NOF Corporation.), Rheodol SP-L10 and Emasol L-10(F) (Kao Corporation), Newcol 20 (Nippon Nyukazai Co., Ltd.) and Sunsoft No. 27N and No. 21SL (Taiyo Kagaku Co., Ltd.) each comprising lauric acid monoester, Sunsoft 47S, 41S and 67N (Taiyo Kagaku Co., Ltd.) and Nonion MP-30R (NOF Corporation.) each comprising myristic acid monoester, and SP-10 (Nikko Chemicals Co., Ltd.), Nonion PP-40R (NOF Corporation.), Rheodol PP-PLO and Emasol P-10 (Kao Corporation) and Newcol 40 (Nippon Nyukazai Co., Ltd.) each comprising palmitic acid monoester.

The polyglycerin fatty acid ester is an ester product of a fatty acid and polyglycerin which is obtained by dehydration condensation reaction of glycerin, and it can exhibit specific solubility, emulsifiability and dispersibility by selecting the kind of the fatty acid and a molar ratio of polyglycerin.

The polyglycerin fatty acid ester used in the present invention shall not specifically be restricted, and capable of being used are polyglycerin fatty acid esters in which the kind of the fatty acids and a molar ratio of polyglycerin are diversified. Also, the commercial products thereof can be used as well. These polyglycerin fatty acid esters each can be used alone or in a mixture of two or more kinds thereof.

The specific commercial products thereof include, for example, DGMS, Tetraglyn 1-S, Hexaglyn 1-S, Decaglyn 1-S, Decaglyn 1-VS and Decaglyn 1-50VS (manufactured by Nikko Chemicals Co., Ltd.), Unigly GS-106 (manufactured by NOF Corporation.), Sunsoft Q-18B, Q-18S, Q-181SW, Q-18F and Q-18U (manufactured by Taiyo Kagaku Co., Ltd.) and Emalex MSG-2, MSG-2 MB, MSG-2ME and MSG-2ML (manufactured by Nihon Emulsion Co., Ltd.) each comprising stearic acid monoester, Decaglyn 2-S (manufactured by Nikko Chemicals Co., Ltd.), Sunsoft Q-182S (manufactured by Taiyo Kagaku Co., Ltd.) and Emalex DSG-3 and DSG-5 (manufactured by Nihon Emulsion Co., Ltd.) each comprising stearic acid diester, Tetraglyn 3-S, Hexaglyn 3-S and Decaglyn 3-S (manufactured by Nikko Chemicals Co., Ltd.) and Emalex TISG-2 (manufactured by Nihon Emulsion Co., Ltd.) each comprising stearic acid triester, DGMIS and Decaglyn 5-IS (manufactured by Nikko Chemicals Co., Ltd.), Unigly GI-106 (manufactured by NOF Corporation.) and DISG-2 (manufactured by Nihon Emulsion Co., Ltd.) each comprising isostearic acid monoester, Emalex DISG-3 and DISG-5 (manufactured by Nihon Emulsion Co., Ltd.) each comprising isostearic acid diester, Tetraglyn 5-S, Hexaglyn 5-S and Decaglyn 5-S (manufactured by Nikko Chemicals Co., Ltd.) and Sunsoft Q-185S (manufactured by Taiyo Kagaku Co., Ltd.) each comprising stearic acid pentaester, Decaglyn 7-S (manufactured by Nikko Chemicals Co., Ltd.) comprising stearic acid heptaester, Decaglyn 10-S (manufactured by Nikko Chemicals CO., Ltd.) and Sunsoft Q-1810S (manufactured by Taiyo Kagaku Co., Ltd.) each comprising stearic acid decaester, Decaglyn 10-IS (manufactured by Nikko Chemicals Co., Ltd.) comprising isostearic acid decaester, DGMO-C, DGMO-90, Tetraglyn 1-O, Hexaglyn 1-O, Decaglyn 1-O and Decaglyn 1-VO (manufactured by Nikko Chemicals Co., Ltd.), GO-106 (manufactured by NOF Corporation.) and Sunsoft Q-17B, Q-17F, Q-17S, Q-171S and Q-17U (manufactured by Taiyo Kagaku Co., Ltd.) each comprising oleic acid monoester, DGDO (manufactured by Nikko Chemicals Co., Ltd.) comprising oleic acid diester, Decaglyn 3-O (manufactured by Nikko Chemicals Co., Ltd.) comprising oleic acid triester, Tetraglyn 5-Q, Hexaglyn 5-O and Decaglyn 5-O (manufactured by Nikko Chemicals Co., Ltd.) each comprising oleic acid pentaester, Decaglyn 7-O (manufactured by Nikko Chemicals Co., Ltd.) comprising oleic acid heptaester, Decaglyn 10-O (manufactured by Nikko Chemicals Co., Ltd.) and Sunsoft Q-170S (manufactured by Taiyo Kagaku Co., Ltd.) each comprising oleic acid decaester, Hexaglyn 1-L and Decaglyn 1-L (manufactured by Nikko Chemicals Co., Ltd.) and Unigly GL-102 and GL-106 (manufactured by NOF Corporation.) each comprising lauric acid monoester, Hexaglyn 1-M and Decaglyn 1-M (manufactured by Nikko Chemicals Co., Ltd.) and Sunsoft Q-14-F and Q-14S (manufactured by Taiyo Kagaku Co., Ltd.) each comprising myristic acid monoester, Emalex GMS-P (manufactured by Nihon Emulsion Co., Ltd.) comprising palmitic acid monoester, Decaglyn 1-LN (manufactured by Nikko Chemicals Co., Ltd.) comprising linoleic acid monoester, and Hexaglyn PR-15 (manufactured by Nikko Chemicals Co., Ltd.) and Sunsoft 818DG and 818UX (manufactured by Taiyo Kagaku Co., Ltd.) each comprising ricinolic acid polyester. They each can be used alone or in a mixture of two or more kinds thereof.

The propylene glycol fatty acid ester is obtained by esterifying propylene glycol with fatty acid or transesterification of propylene glycol and oil & fat, and it has excellent solubility, emulsifiability and dispersibility.

The specific examples of the commercial products thereof include Sunsoft No. 25P (Taiyo Kagaku Co., Ltd.) as a palmitic acid ester type, Sunsoft No. 25M and No. 25MD (Taiyo Kagaku Co., Ltd.) as a myristic acid ester type, Emalex PGML (Nihon Emulsion Co., Ltd.) as a lauric acid type monoester, Emalex PG-di-L (Nihon Emulsion Co., Ltd.) as a lauric acid diester type, PSM-SE, PSM-1C, PSM-1CSE and PSM-FR (Nikko Chemicals Co., Ltd.), Homotex PS-200 (Kao Corporation) and Sunsoft No. 25CD and No. 25S (Taiyo Kagaku Co., Ltd.) as a stearic acid ester type, Nonion PO-100 (NOF Corporation.), Sunsoft No. 25OD and Sunsoft No. 250 (Taiyo Kagaku Co., Ltd.) and Emalex PGO (manufactured by Nihon Emulsion Co., Ltd.) as a oleic acid monoester type, and Emalex PG-di-O (Nihon Emulsion Co., Ltd.) as a oleic acid diester type.

(2)-a Ethylene Oxide Adducts of Polyhydric Alcohol Fatty Acid Esters

The polyoxyethylene trimethylolpropane fatty acid ester used in the present invention is obtained by esterifying polyoxyethylene trimethylolpropane with a fatty acid, and it can be controlled in a surface tension and an interfacial tension by the number of ethylene oxide which is a hydrophilic group and the number and the kind of fatty acid which is a lipophilic group and has excellent solubility, emulsifiability and dispersibility. In the present invention, all publicly known polyoxyethylene trimethylolpropane fatty acid esters can be used as long as the characteristics of the ink composition are not damaged, and they can be used not only alone but also in combination of two or more different kinds thereof.

Capable of being given as the examples of the preferred commercial products of the polyoxyethylene trimethylolpropane fatty acid esters are Emalex TPM-303, Emalex TPM-305, Emalex TPM-308, Emalex TPM-320, Emalex TPM-325 and Emalex TPM-330 which comprise myristic acid ester, Emalex TPS-203, Emalex TPS-204 and Emalex TPS-205 which comprise stearic acid diester, Emalex TPS-303, Emalex TPS-305, Emalex TPS-308 and Emalex TPS-310 which comprise a stearic acid triester, and Emalex TPIS-303, Emalex TPIS-320, Emalex TPIS-325, Emalex TPIS-330, Emalex TPIS-340 and Emalex TPIS-350 which comprise an isostearic acid triester (all manufactured by Nihon Emulsion Co., Ltd.).

The polyoxyethylene glycerin fatty acid ester is a nonionic surfactant obtained by subjecting a ethylene oxide to addition polymerization to a free hydroxyl group of a monoglycerin fatty acid ester, and it has excellent solubility, emulsifiability and dispersibility.

The specific examples of the commercial products thereof include MGS-5 and TMGS-15 (Nikko Chemicals Co., Ltd.) and Emalex GM-5, GM-10, GM-15, GM-30 and GM-40 (Nihon Emulsion Co., Ltd.) each comprising stearic acid monoester, Unisafe EGS-3010, EGS-3020, EOS-3030 and EGS-3040 (NOF Corporation.) and Emalex GWS-303, GWS-304, GWS-305, GWS-306, GWS-310 and GWS-320 (Nihon Emulsion Co., Ltd.) each comprising stearic acid triester, DGMIS and Decaglyn 5-IS (Nikko Chemicals Co., Ltd.), Unisafe EGI-1010, EGI-1020, EGI-1030 and EGI-1040 (NOF Corporation.) and Emalex GWIS-103, GWIS-106, GWIS-110, GWIS-120, GWIS-130 and GWIS-140 (Nihon Emulsion Co., Ltd.) each comprising isostearic acid monoester, Unisafe EGI-3010, EGI-3020, EOI-3030 and EGI-3040 (NOF Corporation.) and Emalex GWIS-303, GWIS-310, GWIS-320, GWIS-330, GWIS-350 and GWIS-360 (Nihon Emulsion Co., Ltd.) each comprising isostearic acid triester, TMGO-5 and TMGO-15 (Nikko Chemicals Co., Ltd.) and Unigly EVO-1113, EVO-1114 and EVO-1117 (NOF Corporation.) each comprising oleic acid monoester, Emalex GWO-303, GWO-310, GWO-320, GWO-330, GWO-340, GWO-350 and GWO-360 (Nihon Emulsion Co., Ltd.) each comprising oleic acid triester, and Glycerox HE (Croda Japan K.K.) comprising coconut oil fatty acid ester.

The polyoxyethylene glycol fatty acid ester is a nonionic surfactant obtained by esterifying one end and both ends of polyethylene glycol and has a large molecular weight as compared with those of the other nonionic surfactants, and it is characterized by that it is excellent in solubility and emulsifiability.

The polyoxyethylene glycol fatty acid ester used in the present invention shall not specifically be restricted, and various polyoxyethylene glycol fatty acid esters obtained by esterifying one end and both ends of polyethylene glycol can be used. Further, the commercial products thereof can be used as well. These polyoxyethylene glycol fatty acid esters can be used alone or in a mixture of two or more kinds thereof.

The specific commercial products thereof include, for example, MYL-10 (manufactured by Nikko Chemicals Co., Ltd.), Nonion L-2 (manufactured by NOF Corporation.) and Emanon 1112 (manufactured by Kao Corporation) in which the fatty acid ester part is lauric acid monoester, Unistar E-222 and Nonion DL-3, DL-4, DL-6, DL-9, DL-14, DL-35 and DL-55 (manufactured by NOF Corporation.) in which the fatty acid ester part is lauric acid diester, Nonion P-3 and P-8 (manufactured by NOF Corporation.) in which the fatty acid ester part is palmitic acid ester, MYS-1EX, MYS-2, MYS-4, MYS-10, MYS-25, MYS-40, MYS-45 and MYS-55 (manufactured by Nikko Chemicals Co., Ltd.), Nonion S-2, S-4, S-6, S-10, S-15 and S-40 (manufactured by NOF Corporation.) and Emanon 3199 (manufactured by Kao Corporation) in which the fatty acid ester part is stearic acid monoester, CDS-400 (manufactured by Nikko Chemicals Co., Ltd.), Unistar E-750, Nonion DS-1, DS-2, DS-3, DS-4, DS-6, DS-9, DS-14 and DS-35 (manufactured by NOF Corporation.) and Emanon 3299 and 3201M (manufactured by Kao Corporation) in which the fatty acid ester part is stearic acid diester, CDIS-400 (manufactured by Nikko Chemicals Co., Ltd.), Uniox IS-600 and IS-800 (manufactured by NOF Corporation.) and Emalex PEIS-3, PEIS-6, PEIS-12 and PEIS-20 (Nihon Emulsion Co., Ltd.) in which the fatty acid ester part is isostearic acid ester, MYO-2, MYO-6 and MYO-10 (manufactured by Nikko Chemicals Co., Ltd.), Nonion O-2, O-3, O-4 and O-6 (manufactured by NOF Corporation.) and Emanon 4110 (manufactured by Kao Corporation) in which the fatty acid ester part is oleic acid monoester, Nonion DO-2, DO-3, DO-4, DO-5, DO-6 and DO-14 (manufactured by NOF Corporation.) and Emalex DEG-O, TEG-O, 200-di-O, 300-di-O, 400-di-O and 600-di-O (manufactured by Nihon Emulsion Co., Ltd.) in which the fatty acid ester part is oleic acid diester, and Sklilate 300, 600 and 1000 (manufactured by Croda Japan K.K.) in which a fatty acid ester part is lanolin fatty acid. They can be used alone or in a mixture of two or more kinds thereof.

The polyoxyethylene sorbit fatty acid ester is a surfactant comprising as a hydrophilic group, a sorbit part to which ethylene oxide is added and comprising a fatty acid part as a lipophilic group, and it has specific surface active ability. In the present invention, all publicly known polyoxyethylene sorbit fatty acid esters can be used as long as the characteristics of the ink composition are not damaged, and they can be blended not only alone but also in combination of two or more different kinds thereof. Capable of being given as the examples of the preferred commercial products of the polyoxyethylene sorbit fatty acid esters are GL-1 (manufactured by Nikko Chemicals Co., Ltd.) in which the lipophilic group is lauric acid monoester, GS-6 (manufactured by Nikko Chemicals Co., Ltd.) in which the lipophilic group is stearic acid hexaester, GS-460 (manufactured by Nikko Chemicals Co., Ltd.) in which the lipophilic group is stearic acid tetraester, GO-4, GO-430N and GO-460 (manufactured by Nikko Chemicals Co., Ltd.), Rheodol 430 and Rheodol 460 (manufactured by Kao Corporation), Solbon TR-843 (manufactured by Toho Chemical Industry Co., Ltd.) and Emalex EG-2854-0 (manufactured by Nihon Emulsion Co., Ltd.) in which the lipophilic group is oleic acid tetraester.

The polyoxyethylene sorbitan fatty acid ester is a surfactant comprising as a hydrophilic group, a sorbitan part to which ethylene oxide is added and comprising a fatty acid part as a lipophilic group, and it has specific surface active ability.

The examples of the specific commercial products thereof include TL-10 (Nikko Chemicals Co., Ltd.), Nonion LT-211 (NOF Corporation.), Rheodol TW-L120 and TW-L106 (Kao Corporation), Newcol 25 (Nippon Nyukazai Co., Ltd.), TW-20 (Daiichi Kogyo Seiyaku Co., Ltd.) and Solbon T-20 (Toho Chemical Industry Co., Ltd.) in which the lipophilic group is lauric acid monoester, TP-10 (Nikko Chemicals Co., Ltd.), Nonion PT-221 (NOF Corporation.), Rheodol TW-P120 (Kao Corporation), Newcol 45 (Nippon Nyukazai Co., Ltd.) and Solbon T-40 (Toho Chemical Industry Co., Ltd.) in which the lipophilic group is palmitic acid monoester, TS-10 and TS-106 (Nikko Chemicals Co., Ltd.), Nonion ST-221 and ST-206 (NOF Corporation.), Rheodol TW-S120 and TW-S106 (Kao Corporation), Newcol 65 (Nippon Nyukazai Co., Ltd.), TW-60 (Daiichi Kogyo Seiyaku Co., Ltd.) and Emalex EG-2854 (Nihon Emulsion Co., Ltd.) in which the lipophilic group is stearic acid monoester, TS-30 (Nikko Chemicals Co., Ltd.), Nonion ST-521 (NOF Corporation.) and Rheodol TW-S320 (Kao Corporation) in which the lipophilic group is stearic acid-triester, TI-10 (Nikko Chemicals Co., Ltd.) in which the lipophilic group is isostearic acid monoester, TO-10 and TO-106 (Nikko Chemicals Co., Ltd.), Nonion OT-203, OT-206 and OT-240 (NOF Corporation.), Rheodol TW-0120, TW-0105R and TW-0106 (Kao Corporation) and TW-80 (Daiichi Kogyo Seiyaku Co., Ltd.) in which the lipophilic group is oleic acid monoester, TO-30 (Nikko Chemicals Co., Ltd.), Rheodol TW-0320 (Kao Corporation), Newcol 82, 3-85 and 95FJ (Nippon Nyukazai Co., Ltd.) and Solbon T-85 (Toho Chemical Industry Co., Ltd.) in which the lipophilic group is oleic acid triester, and Unix NFL-6563 and NFL-6303 (NOF Corporation.) in which the lipophilic group is oleic acid tetraester.

(2)-b Ethylene Oxide Adducts of Alkylphenols and Higher Alcohols

The polyoxyethylene alkylphenyl ether used in the present invention is obtained by subjecting ethylene oxide to addition polymerization to an alkylphenol or alkylnaphthol. It does not contain an ester bond and therefore is very stable against acid, alkali and hydrolysis, and it can exhibit a specific surface active performance according to the number and the kind of the alkyl group and a mole number of ethylene oxide.

The examples of the specific commercial products thereof include NP-2, NP-5, NP-7.5, NP-10, NP-15, NP-18TX and NP-20 (Nikko Chemicals Co., Ltd.), Nonion NS-202, NS-204.5, NS-206, NS-208.5, NS-210, NS-212, NS-215, NS-220, NS-230, NS-240 and NS-270 (NOF Corporation.), Emulgen 903, 904, 905, 906, 909, 910, 911, 913, 920 and 930 (Kao Corporation), Newcol 156H, 562, 560H, 563, 564, 565, 566, 568, 504, 506, 509, 512, 516 and 520 (Nippon Nyukazai Co., Ltd.) and Noigen EA-50, EA-70, EA-80E, EA-80, EA-110, EA-130T, EA-150 and EA-160 (Daiichi Kogyo Seiyaku Co., Ltd.) as a nonylphenyl type, and OP-3, OP-10 and OP-30 (Nikko Chemicals Co., Ltd.), Nonion HS-204.5, HS-206, HS-208.5, HS-210, HS-215, HS-220 and HS-240 (NOF Corporation.), Emulgen 810 and 840S (Kao Corporation) and Noigen EA-92, EA-102, EA-112, EA-142 and EA-152 (Daiichi Kogyo Seiyaku Co., Ltd.) as an octylphenyl type.

The polyoxyethylene alkyl ether is obtained by subjecting ethylene oxide to addition polymerization to an aliphatic alcohol having 12 to 22 carbon atoms. Aliphatic alcohols include, for example, animal and plant oil & fat base alcohols such as lauryl alcohol, cetyl alcohol, oleyl alcohol and beef tallow alcohol, synthetic alcohols such as oxoalcohol, and resin alcohols, and selection of the kind of this aliphatic alcohol makes it possible to exhibit specific solubility, emulsifiability and dispersibility to the water based ink composition for a writing instrument comprising a colorant, a perfume and water.

The polyoxyethylene alkyl ether used in the present invention shall not specifically be restricted, and various polyoxyethylene alkyl ethers obtained by changing the kind of the aliphatic alcohol and an addition mole number of ethylene oxide can be used. Further, the commercial products thereof can be used as well. These polyoxyethylene alkyl ethers each can be used alone or in a mixture of two or more kinds thereof.

The specific commercial products thereof include, for example, K-201, K-202, K-204, K-207, K-211, K-220 and K-230 (manufactured by NOF Corporation.), Emulgen 104P, 106, 108, 109, 120 and 123P (manufactured by Kao Corporation), Noigen ET-83, ET-102, ET-143, ET-160, ET-170 and ET-190 (manufactured by Daiichi Kogyo Seiyaku Co., Ltd.), Newcol 1105, 1100, 1110 and 1120 (manufactured by Nippon Nyukazai Co., Ltd.) and BL-2, BL-4, BL-9EX, BL-21 and BL-25 (manufactured by Nikko Chemicals Co., Ltd.) each comprising lauryl alcohol, BC-2, BC-5.5, BC-7, BC-10TX, BC-15TX, BC-20TX, BC-23, BC-30TX and BC-40TX (manufactured by Nikko Chemicals Co., Ltd.), Nonion P-208, P-210, P-213, P-223 and P-240 (manufactured by NOF Corporation.), Emulgen 210P and 220 (manufactured by Kao Corporation), Newcol 1610 and 1620 (manufactured by Nippon Nyukazai Co., Ltd.) and Emalex 102, 103, 105, 107, 110, 112, 115, 120 and 130 (manufactured by Nihon Emulsion Co., Ltd.) each comprising cetyl alcohol, BS-2, BS-4 and BS-20 (manufactured by Nikko Chemicals Co., Ltd.), Nonion S-206, S-211, S-207, S-215, S-220 and S-230 (manufactured by NOF Corporation.), Emulgen 306P and 320 (manufactured by Kao Corporation), Newcol 1807 and 1820 (manufactured by Nippon Nyukazai Co., Ltd.) and Emalex 602, 605, 608, 611, 615, 620 and 630 (manufactured by Nihon Emulsion Co., Ltd.) each comprising stearyl alcohol, Emalex 1805, 1810, 1815, 1820 and 1825 (manufactured by Nihon Emulsion Co., Ltd.) each comprising isostearyl alcohol, BO-7, BO-10TX, BO-20 and BO-50 (manufactured by Nikko Chemicals Co., Ltd.), Nonion E-205, E-212, E-220 and E-230 (manufactured by NOF Corporation.), Emulgen 404, 408, 409, 420 and 430 (manufactured by Kao Corporation), Newcol 1203, 1204, 1208, 1210 and 1200 (manufactured by Nippon Nyukazai Co., Ltd.) and Noigen ET-60E, ET-80E, ET-100E, ET-120E, ET-140E and ET-150E (manufactured by Daiichi Kogyo Seiyaku Co., Ltd.) each comprising oleyl alcohol, Emalex 1608, 1610, 1615, 1620 and 1625 (manufactured by Nihon Emulsion Co., Ltd.) each comprising hexyldecyl alcohol, BB-5, BB-10, BB-20 and BB-205, B-210, B-220 and B-230 (manufactured by NOF Corporation.) and Emalex BHA-5, BHA-10, BHA-20 and BHA-30 (manufactured by Nikko Chemicals Co., Ltd.), Nonion B-205, B-210, B-220 and B-230 (manufactured by NOF Corporation.) and Emalex BHA-5, BHA-10, BHA-20 and BHA-30 (manufactured by Nihon Emulsion Co., Ltd.) each comprising behenyl alcohol, and Nonion T-203, T-208.5, T-206, T-210, T-211 and T-212 (manufactured by NOF Corporation.), Emulgen 2025 (manufactured by Kao Corporation), Newcol 1305 and 1310 (manufactured by Nippon Nyukazai Co., Ltd.) and Emalex OD-5, OD-10, OD-20 and OD-25 (manufactured by Nihon Emulsion Co., Ltd.) each comprising dodecyl alcohol. They each can be used alone or in a mixture of two or more kinds thereof.

A compound comprising polyoxyethylene cholesteryl ether can be obtained by subjecting ethylene oxide to addition polymerization to phytosterol widely present in vegetable-oil & fat and cholesterol present in animal fat & oil.

An addition mole number of ethylene oxide is preferably 3 to 50 moles. The more the mole number is, the more the HLB increases, and the larger the hydration tends to grow. At least one perfume can be selected and used according to the kind thereof.

The examples of the specific commercial products thereof include BPS-5, BPS-10, BPS-20, BPS-30 and BPSH-25 (manufactured by Nikko Chemicals Co., Ltd.) as a type in which ethylene oxide is added to vegetable oil & fat phytosterol and include DHC-30 (manufactured by Nikko Chemicals Co., Ltd.) and Emalex CS-5, Emalex CS-10, Emalex CS-15, Emalex CS-24 and Emalex CS-30 (manufactured by Nihon Emulsion Co., Ltd.) as a type in which ethylene oxide is added to animal oil & fat cholesterol.

Polyoxyethylene lanolin is a nonionic surfactant obtained by subjecting ethylene oxide to addition polymerization to lanolin alcohol. These polyoxyethylene lanolin and lanolin alcohol are excellent in solubility, emulsifiability and dispersibility.

Polyoxyethylene lanolin and lanolin alcohol which are used in the present invention shall not specifically be restricted, and various polyoxyethylene lanolins can be used according to an addition mole number of ethylene oxide. Further, the commercial products thereof can be used as well. These polyoxyethylene lanolin and lanolin alcohol each can be used alone or in a mixture of two or more kinds thereof.

The specific commercial products thereof include, for example, TW-10, TW-20 and TW-30 (manufactured by Nikko Chemicals Co., Ltd.) and Solan A, Solan A50, Solan E, Polycol WH50, Polycol WH150 and Polycol WH400 (manufactured by Croda Japan K.K.) as a lanolin type, and BWA-5, BWA-10, BWA-20 and BWA-40 (manufactured by Nikko Chemicals Co., Ltd.), Lamigen ET-20 and ET-70 (manufactured by Daiichi Kogyo Seiyaku Co., Ltd.) and Polycol 5, Polycol 15, Polycol 20 and Polycol 40 (manufactured by Croda Japan K.K.) as a lanolin alcohol type. They each can be used alone or in a mixture of two or more kinds thereof.

(2)-c Ethylene Oxide and Propylene Oxide Adducts of Higher Alcohol

The polyoxyethylene polyoxypropylene glycol ether used in the present invention is a high molecular active agent in which polypropylene glycol which is a polymer of propylene oxide acts as a lipophilic group and in which polyethylene glycol which is a polymer of ethylene oxide acts as a hydrophilic group. Polyethylene glycols which are a hydrophilic group are present on both sides of polypropylene glycol which is a lipophilic group, and the excellent solubility, emulsifiability and dispersibility can be exhibited.

The polyoxyethylene polyoxypropylene glycol ether used in the present invention shall not specifically be restricted, and various ones can be used according to a polymerization degree of propylene oxide and a polymerization degree of ethylene oxide. Further, the commercial products thereof can be used as well. These polyoxyethylene polyoxypropylene glycol ethers each can be used alone or in a mixture of two or more kinds thereof.

The specific commercial products thereof include, for example, Pronon 104, 108, 122, 123, 182, 183, 185, 204, 205, 207, 208, 231, 237, 282, 284, 288, 331, 333, 334, 335, 338, 402 and 403 which are marketed from NOF Corporation., and they each can be used alone or in a mixture of two or more kinds thereof.

The polyoxyethylene polyoxypropylene alkyl ether is obtained by subjecting ethylene oxide and propylene oxide to addition polymerization to a linear or branched higher alcohol, and it is a nonionic surfactant having excellent solubility, emulsifiability and dispersibility since it has two kind of oxides having different properties in the same molecule.

The polyoxyethylene polyoxypropylene alkyl ether used in the present invention shall not specifically be restricted, and various polyoxyethylene polyoxypropylene alkyl ethers can be used according to the addition mole numbers of ethylene oxide and propylene oxide. Further, the commercial products thereof can be used as well. These polyoxyethylene polyoxypropylene alkyl ethers each can be used alone or in a mixture of two or more kinds thereof.

The specific commercial products thereof include, for example, PBC-31, PBC-33, PBC-34, PBC-44, PEN-4612, PEN-4620 and PEN-6430 (manufactured by Nikko Chemicals Co., Ltd.), Unisafe 1P-1, 5P-1, 10P-1, 20P-2, 1P-2, 5P-2, 1P-4, 5P-4, 10P-4, 20P-4, 1P-8, 5P-8 and 10P-8, Unible 30MT-25B, 50MT-2, 50 MB-5, 50 MB-11, 50 MB-26, 50 MB-72 and 50 MB-168 and Nonion A-13P, A-10R and 3S-9 and Uniox OD-1200 (manufactured by NOF Corporation.), Putisel ASW (manufactured by Croda Japan K.K.), and Neoscore 2326 and Hepol A-0638, A-0851, A-0858, AS-053×and AS-054C (manufactured by Toho Chemical Industry Co., Ltd.). They each can be used alone or in a mixture of two or more kinds thereof.

(3) Ethylene Oxide Adducts of Castor Oil or Hardened Castor Oil

The polyoxyethylene castor oil or polyoxyethylene hardened castor oil used in the present invention is a nonionic surfactant obtained by subjecting ethylene oxide to addition polymerization to castor oil or hydrogenated castor oil. Polyoxyethylene groups are added while maintaining a triglyceride structure, and it is characterized by that it has a large molecular weight as compared with those of the other nonionic surfactants and that it is excellent in solubility, emulsifiability and dispersibility. In the present invention, all publicly known polyoxyethylene castor oils or polyoxyethylene hardened castor oils can be used as long as the characteristics of the ink composition are not damaged, and they can be used not only alone but also in combination of two or more different kinds thereof.

Capable of being given as the examples of the preferred commercial products of the polyoxyethylene castor oil or the polyoxyethylene hardened castor oil are CO-3, CO-10, CO-20TX, CO-50TX and CO-60TX (all manufactured by Nikko Chemicals Co., Ltd.), Noigen CX-100 (manufactured by Daiichi Kogyo Seiyaku Co., Ltd.) and Emalex C-20, C-30, C-40 and C-50 (all manufactured by Nihon Emulsion Co., Ltd.) as the ethylene oxide adducts of castor oil, and HCO-5, HCO-10, HCO-20, HCO-30, HCO-40, HCO-50, HCO-60, HCO-80 and HCO-100 (all manufactured by Nikko Chemicals Co., Ltd.), Uniox HC-10, HC-40, HC-50 and HC-60 (all manufactured by NOF Corporation.), Emalex HC-5, HC-7, HC-10, HC-20, HC-30, HC-40, HC-50, HC-60, HC-80 and HC-100 (all manufactured by Nihon Emulsion Co., Ltd.), Emanon CH-25, CH-40, CH-60 and CH-80 (all manufactured by Kao Corporation) and Pegzol HC-10, HC-20 and HC-25 (all manufactured by Toho Chemical Industry Co., Ltd.) as the ethylene oxide adducts of hardened castor oil.

(3)-a Fatty Acid Esters of Polyoxyethylene Hardened Castor Oil

The fatty acid ester of polyoxyethylene hardened castor oil used in the present invention is obtained by esterifying polyoxyethylene hardened castor oil with a fatty acid and has a large molecular weight as compared with those of conventional surfactants, and it can be controlled in an interfacial tension and a surface tension according to the kind of the fatty acid and has excellent solubility, emulsifiability and dispersibility. In the present invention, all publicly known fatty acid esters of polyoxyethylene hardened castor oil can be used as long as the characteristics of the ink composition are not damaged, and they can be used not only alone but also in combination of two or more different kinds thereof.

Capable of being given as the examples of the preferred commercial products of the fatty acid esters of polyoxyethylene hardened castor oil are Uniox HC-203MS, HC-210MS, HC-230MS and HC-240MS (all manufactured by NOF Corporation.) and Emalex RWIS-105, RWIS-110, RWIS-115, RWIS-120, RWIS-130, RWIS-140, RWIS-150 and RWIS-160 (all manufactured by Nihon Emulsion Co., Ltd.) in which the fatty acid part comprises isostearic acid monoester, Emalex RWIS-305, RWIS-310, RWIS-315, RWIS-320, RWIS-330, RWIS-340, RWIS-350 and RWIS-360 (all manufactured by Nihon Emulsion Co., Ltd.) in which the fatty acid part comprises isostearic acid triester, and Emalex RWL-120, RWL-130, RWL-140 and RWL-150 (all manufactured by Nihon Emulsion Co., Ltd.) in which the fatty acid part comprises lauric acid.

(4) Ethylene Oxide Adducts of Alkylamine and Fatty Acid Amide

The polyoxyethylene alkylamine used in the present invention is obtained by reacting ethylene oxide with two active hydrogens of higher alkylamine to subject ethylene oxide to addition polymerization to at least one hydrogen bonded to nitrogen. Further, the polyoxyethylene fatty acid amide is obtained by addition polymerization of ethylene oxide to fatty acid amide or dehydration condensation of fatty acid amide and polyethylene glycol.

They can exhibit excellent solubility, emulsifiability and dispersibility.

The polyoxyethylene alkylamine and polyoxyethylene fatty acid amide used in the present invention shall not specifically be restricted, and various polyoxyethylene alkylamines and polyoxyethylene fatty acid amides can be used according to the addition mole number of ethylene oxide. Further, the commercial products thereof can be used as well. These polyoxyethylene alkylamines and polyoxyethylene fatty acid amides each can be used alone or in a mixture of two or more kinds thereof.

The specific commercial products thereof include, for example, TAMNS-5, TAMSN-10, TAMSN-15, TAMSN-8, TAMNO-5 and TAMNO-15 (manufactured by Nikko Chemicals Co., Ltd.) and Nymine S-202, S-205, S-210, S-215, S-250, O-202, O-205, O-215, L-201, L-202 and L-207 (manufactured by NOF Corporation.) as polyoxyethylene alkylamine, and TAMDS-4, TAMDS-15, and TAMDO-5 (manufactured by Nikko Chemicals Co., Ltd.), Nymide MO-202, MO-204, MO-205, MO-206, MO-207, L-203, L-206, R-207, F-205 and F-215 and Unisafe A-LY (manufactured by NOF Corporation.) and Newcol 405, 410 and 420 (manufactured by Nippon Nyukazai Co., Ltd.) as polyoxyethylene fatty acid amide. They each can be used alone or in a mixture of two or more kinds thereof.

In the present invention, a content of one of the respective nonionic surfactants described above or the total content of a mixture of two or more kinds thereof is preferably about a range of 0.1 to 15% by weight, more preferably 0.5 to 7% by weight based on the total amount of the ink composition.

If the content of these nonionic surfactants is less than 0.1% by weight based on the total amount of the ink composition, the feathering-inhibiting effect, the fragrance durability-improving effect and the perfume dispersion-inhibiting effect are inferior, and the effects of the present invention can not be exhibited. On the other hand, if it exceeds 15% by weight, the ink is less liable to be dried when the ink is transferred on a paper face, and a discharge amount of the ink from a pen tip is reduced when it is used for a ballpoint pen. Accordingly, both ranges are not preferred.

The colorant used in the present invention includes, for example, pigments and water soluble dyes.

The pigment shall not specifically be restricted and includes at least one selected from inorganic and organic pigments, titanium oxide and pseudo pigments obtained by coloring resin emulsions with dyes, which have so far been used for a water based ink composition.

The inorganic pigments include, for example, carbon black, metal powder and the like.

The organic pigments include, for example, azo lakes, insoluble azo pigments, chelate azo pigments, phthalocyanine pigments, perylene and perinone pigments, anthraquinone pigments, quinacridone pigments, dye lakes, nitro pigments and nitroso pigments.

To be specific, included are inorganic pigments such as carbon black, titanium black, zinc oxide, red iron oxide, chromium oxide, mica titan, black iron oxide, cobalt blue, yellow iron oxide, viridian, zinc sulfide, lithopone, cadmium yellow, vermilion, cadmium red, chrome yellow, molybdate orange, zinc chromate, strontium chromate, white carbon, clay, talc, ultramarine, precipitated barium sulfate, baryte powder, calcium carbonate, white lead, Prussian blue, manganese violet, aluminum powder and bronze powder, C. I. Pigment Blue 1, C. I. Pigment Blue 15, C. I. Pigment Blue 17, C. I. Pigment Blue 27, C. I. Pigment Red 5, C. I. Pigment Red 22, C. I. Pigment Red 38, C. I. Pigment Red 48, C. I. Pigment Red 49, C. I. Pigment Red 53, C. I. Pigment Red 57, C. I. Pigment Red 81, C. I. Pigment Red 104, C. I. Pigment Red 146, C. I. Pigment Red 245, C. I. Pigment Yellow 1, C. I. Pigment Yellow 3, C. I. Pigment Yellow 12, C. I. Pigment Yellow 13, C. I. Pigment Yellow 14, C. I. Pigment Yellow 17, C. I. Pigment Yellow 34, C. I. Pigment Yellow 55, C. I. Pigment Yellow 74, C. I. Pigment Yellow 83, C. I. Pigment Yellow 95, C. I. Pigment. Yellow 166, C. I. Pigment Yellow 167, C. I. Pigment Orange 5, C. I. Pigment Orange 13, C. I. Pigment Orange 16, C. I. Pigment Violet 1, C. I. Pigment Violet 3, C. I. Pigment Violet 19, C. I. Pigment Violet 23, C. I. Pigment Violet 50, and C. I. Pigment Green 7.

The pseudo pigments obtained by coloring resin emulsions with dyes include, for example, those obtained by coloring resins comprising copolymers of acrylonitrile, styrene and methyl methacrylate with dyes.

Any of direct dyes, acid dyes, food colors and basic dyes can be used for the water-soluble dyes.

The direct dyes include, for example, C. I. Direct Black 17, ditto 19, ditto 22, ditto 32, ditto 38, ditto 51 and ditto 71, C. I. Direct Yellow 4, ditto 26, ditto 44 and ditto 50, C. I. Direct Red 1, ditto 4, ditto 23, ditto 31, ditto 37, ditto 39, ditto 75, ditto 80, ditto 81, ditto 83, ditto 225, ditto 226 and ditto 227, C. I. Direct Blue 1, ditto 15, ditto 71, ditto 86, ditto 106 and ditto 119.

The acid dyes include, for example, C. I. Acid Black 1, ditto 2, ditto 24, ditto 26, ditto 31, ditto 52, ditto 107, ditto 109, ditto 110, ditto 119 and ditto 154, C. I. Acid Yellow 7, ditto 17, ditto 19, ditto 23, ditto 25, ditto 29, ditto 38, ditto 42, ditto 49, ditto 61, ditto 72, ditto 78, ditto 110, ditto 127, ditto 135, ditto 141 and ditto 142, C. I. Acid Red 8, ditto 9, ditto 14, ditto 18, ditto 26, ditto 27, ditto 35, ditto 37, ditto 51, ditto 52, ditto 57, ditto 82, ditto 87, ditto 92, ditto 94, ditto 115, ditto 129, ditto 131, ditto 138, ditto 186, ditto 249, ditto 254, ditto 265 and ditto 276, C. I. Acid Violet 15 and ditto 17, C. I. Acid Blue 1, ditto 7, ditto 9, ditto 15, ditto 22, ditto 23, ditto 25, ditto 40, ditto 41, ditto 43, ditto 62, ditto 78, ditto 83, ditto 90, ditto 93, ditto 103, ditto 112, ditto 113, and ditto 158, C. I. Acid Green 3, ditto 9, ditto 16, ditto 25 and ditto 27.

A large part of the food colors is included in the direct dyes and the acid dyes, and C. I. Food Yellow 3 is given as one example of those which are not included therein.

The basic dyes include, for example, C. I. Basic Yellow 1, ditto 2 and ditto 21, C. I. Basic Orange 2, ditto 14 and ditto 32, C. I. Basic Red 1, ditto 2, ditto 9 and ditto 14, C. I. Basic Violet 1, ditto 3 and ditto 7, C. I. Basic Green 4, C. I. Basic Brown 12, C. I. Basic Black 2 and ditto 8.

These colorants each may be used alone or in combination of two or more kinds thereof.

A content of these colorants is 0.5 to 40% by weight, preferably 1 to 30% by weight based on the total amount of the ink composition.

The perfume used in the present invention includes, for example, those described in the following 1) to 6), and they each may be used alone or in combination of two or more kinds thereof:

1) Essential oils such as grape fruit oil, orange oil, lemon oil, lime oil, ylang ylang oil, chammomile oil, jasmin oil, hiba oil, peppermint oil, lavender oil and rosemary oil.
2) Terpenes such as α-pinene, β-pinene and limonene.
3) Alcohols such as linalool, 1-menthol, geraniol, borneol, lavandulol, hexyl alcohol, phenylethyl alcohol (Rose P), furfuryl alcohol, cyclotene, maltol, eugenol and α-phenylethanol.
4) aldehydes such as heptanal, octanal, dodecanal, tetradecanal, hexadecanal, citral, lyral, benzaldehyde and cyclamen aldehyde.
5) Esters such as ethyl acetate, propyl acetate, amyl acetate, linallyl acetate, benzyl acetate, dimethylbenzyl-carbinyl acetate and benzyl propionate.
6) Aromatic compounds such as nootkatone, ethylpyrazine, lemon terpeneless, orange terpeneless, ethylvanillin, furfurylmercaptan and heliol.

In the present invention, capable of being used as well are blended perfumes prepared by suitably combining the respective perfumes described above, for example, various blended perfumes of banana perfume, blueberry perfume, vanilla perfume, mint perfume, apple perfume, peach perfume, melon perfume, pineapple perfume, grape perfume, lilac perfume and jasmin perfume.

For example, the banana perfume can be prepared by suitably blending vanillin, ethylvanillin, n-hexanal, isoamyl alcohol, trans-2-hexenal, n-butanol, isoamyl acetate, butyl acetate, isobutyl acetate, diacetyl, ethyl acetate, hexyl acetate, isoamyl butyrate, isoamyl isovalerate, cis-3-hexenol, cis-3-hexenyl acetate, acetic acid, isoeugenol, ethyl butyrate and a solvent. Further, the pineapple perfume can be prepared by suitably blending benzyl acetate, orange oil 3-fold, vanillin, isoamyl acetate, isoamyl butyrate, ethyl butyrate, ethyl heptanoate, ethyl hexanoate, ethyl butyrate and allyl hexanoate.

Further, capable of being used as well are commercially available various blended perfumes, for example, vanilla perfume [Vanilla BVK-3359 (manufactured by Takasago International Corporation.)], mint perfume [Mint THP-8148 (manufactured by T. Hasegawa Co., Ltd.)], banana perfume [Banana T-1510 (manufactured by Yamamoto Perfumery Co., Ltd.)] and blueberry perfume [Blueberry V-647 (manufactured by Yamamoto Perfumery Co., Ltd.)].

A content of these perfumes falls in a range of 0.01 to 10% by weight, preferably 0.1 to 6% by weight based on the total amount of the ink composition.

If a content of these perfumes is less than 0.01% by weight, fragrance does not last long, and comes to be not smelt. On the other hand, if it exceeds 10% by weight, an adverse effect is exerted on the aging stability of the ink composition. Accordingly, both ranges are not preferred.

In the present invention, the perfume is used in a range of the content (0.01 to 10% by weight) described above and added preferably in an amount of 70% or less, more preferably 60% or less in terms of a weight ratio based on at least one (one component or a mixture of two or more components) of the nonionic surfactants.

Setting this weight ratio makes it possible to further display the feathering inhibiting effect, the fragrance durability-improving effect and the separation-inhibiting effect of the perfume.

In the present invention, a viscosity-controlling agent is preferably added from a viewpoint of preventing settling when the pigment notably settles down.

The viscosity-controlling agent used includes at least one selected from synthetic polymers, natural gums, celluloses and polysaccharides.

The synthetic polymers include, for example, polyacrylic acid and cross-linking type copolymers thereof, polyvinyl alcohol, polyvinylpyrrolidone and derivatives thereof, and polyvinyl methyl ether and derivatives thereof. The natural gums and the polysaccharides include, for example, tragacanth gum, guar gum, locust bean gum and xanthan gum. The celluloses include methyl cellulose, ethyl cellulose, hydroxyethyl cellulose and carboxymethyl cellulose.

To be specific, included are products on the market such as "Junron PW-111" manufactured by Nihon Junyaku Co., Ltd., "Hiviswako 104" manufactured by Wako Pure Chemical Ind. Co., Ltd., "KELZAN", "KELZAN AR", K1A96", K1A112", "RHEOZAN" and "K7C233" manufactured by Sansho Co., Ltd., "JAGUAR HP-8". "JAGUAR HP-60", "RHODOPOL 23" and "RHODOPOL 50MC" manufactured by Rhone Poulenc Japan Co., Ltd., and "Echo Gum GM" manufactured by Dainippon Pharmaceutical Co., Ltd.

A content of these viscosity-controlling agents is preferably 0.1 to 1.5% by weight based on the total amount of the ink composition. The content varies depending on the kind of the viscosity-controlling agents, and it is preferably 0.1 to 1.5% by weight in the case of the synthetic polymers and preferably 0.1 to 0.8% by weight in the case of the natural polysaccharides.

If a content of these viscosity-controlling agents is less than 0.1% by weight, the effect of adding the viscosity-controlling agent can not be exhibited. On the other hand, if it exceeds 1.5% by weight, the ink is reduced in fluidity and tends to be liable to cause inferior writing because of the poor followability.

Other components (optional components) which are used for an ink composition for a writing instrument can further be added, if necessary, to the ink composition of the present invention as long as the effects of the present invention are not damaged.

Capable of being suitably selected and used as the other usable components are, for example, solvents including water-soluble polyhydric alcohols such as ethylene glycol, propylene glycol and glycerin, cellosolves such as ethylene glycol monomethyl ether (methyl cellosolve) and ethylene glycol monoethyl ether (ethyl cellosolve), carbitols such as diethylene glycol monomethyl ether (methyl carbitol) and diethylene glycol monoethyl ether (ethyl carbitol) and glycol ether esters such as ethylene glycol monoethyl ether acetate; pH adjusting agents including ammonia, urea, monoethanolamine, diethanolamine, triethanolamine, alkaline metal salts of carbonic acid and phosphoric acid such as sodium tripolyphosphate and sodium carbonate, and hydroxides of alkaline metals such as sodium hydroxide; preservatives or fungicides including phenol, sodium omadine, sodium pentachlorophenol, 1,2-benzisothiazoline-3-one, 2,3,5,6-tetrachloro-4-(methylsulfonyl)pyridine, alkaline metal salts of benzoic acid, sorbic acid and dehydroacetic acid such as sodium benzoate, and benzimidazole base compounds; rust preventives such as benzotriazole, dicyclohexylammonium nitrite, diisopropylammonium nitrite and tolyltriazole; anionic surfactants comprising carboxylic acids and sulfonic acids; cationic surfactants comprising ammonium salts and amines; and in addition thereto, lubricants, wetting agents and defoaming agents comprising amphoteric surfactants and nonionic surfactants.

Water used in the present invention includes purified water and ion-exchanged water, and a content thereof is a remainder (balance) of the total content of the respective components described above.

The water based ink composition for a writing instrument of the present invention can suitably be used for ballpoint pens, writing brush pens, felt-tip pens and markers.

In the water based ink composition for a writing instrument of the present invention thus constituted, in order to solve the respective problems described above caused when using the perfume, added as well as the colorant, the perfume and water is at least one of the nonionic surfactants which have a function as a feathering inhibitor, a function as a fragrance durability-improving agent and a function for inhibiting separation of the perfume, whereby exhibited are specific actions that the lines are less liable to cause feathering and fragrance is durable and that the perfume is dispersed and retained in an aqueous medium in a stable state (these points shall further be explained in detail in examples described later).

EXAMPLES

The present invention shall be explained below in detail with reference to examples and comparative examples, but it is a matter of course that the present invention shall not be restricted to the examples described below.

The water based ink compositions obtained in the respective examples and comparative examples were evaluated for feathering of the ink, fragrance, separation of the perfume, coagulation of the pigment and writing feeling by the following evaluation methods. Ballpoint pens for evaluation were prepared to evaluate feathering of the ink, fragrance and writing feeling.

Preparation of Ballpoint Pens for Evaluation

The respective inks were charged into refills comprising a polypropylene-made ink reservoir with an inner diameter of 4.0 mm and a length of 115 mm having no feed and a stainless-made tip with a ball having a ball diameter of 0.7 mm to prepare ballpoint pens for evaluation (UM-100 manufactured by Mitsubishi Pencil K.K.).

Evaluation Method of Feathering:

The ballpoint pen was used to write on a paper face (wood free paper) and sensorily evaluated according to the following evaluation criteria.

Evaluation Criteria:

○: no feathering and clear lines

Δ: feathering observed and unclear lines

X: very unclear lines due to feathering

Evaluation Method of Fragrance:

The ballpoint pen was used to write on a paper face (wood free paper) and sensorily evaluated according to the following evaluation criteria.

Evaluation Criteria:

○: smell is felt in writing, and the lines smell even after 5 hours

X: smell is felt in writing, but the lines do not smell after 5 hours

Evaluation Method of Separation of the Perfume:

The respective inks were tightly sealed in a vessel and left standing in a constant temperature chamber of 50° C. for 7 days, and then it was left cooling to evaluate the state of the inks according to the following evaluation criteria.

Evaluation Criteria:

○: no change from before the test

X: perfume separated

Evaluation Method of Coagulation of the Pigment:

The respective inks were tightly sealed in a vessel and left standing at room temperature for one week, and then they were passed through a sieve of 100 $\mu$m and evaluated according to the following evaluation criteria. The pigment was evaluated for coagulation in order to evaluate a dispersion stability of the pigment.

Evaluation Criteria:
○: no residue
X: the ink is less liable to pass through the sieve or residue was present on the sieve Evaluation Method of Writing Feeling:

The ballpoint pen was used to write on a paper face (wood free paper) and evaluated the writing feeling according to the following evaluation criteria.

Evaluation Criteria
◎: very smooth writing feeling
○: smooth writing feeling
Δ: writing feeling having a little poor smoothness
X: very heavy writing feeling, and unpleasant feeling such as scratching is given (unusable level)

EXAMPLES 1 TO 40 AND COMPARATIVE EXAMPLES 1 TO 3

Water based ink compositions for a writing instrument were prepared according to blending formations shown in the following Table 1.

The results in the evaluation tests of the ink compositions are shown in Table 1.

TABLE 1

(blend unit: % by weight)

| | | | Remark | Comparative Example | | | Example | | | | | | | | | |
|---|---|---|---|---|---|---|---|---|---|---|---|---|---|---|---|---|
| | | | | 1 | 2 | 3 | 1 | 2 | 3 | 4 | 5 | 6 | 7 | 8 | 9 | 10 |
| Blend formation | Colorant | Blue pigment | (1) | 10.0 | | | 10.0 | 10.0 | | | | | | 10.0 | | |
| | | Yellow pigment | (2) | | 10.0 | | | | 10.0 | | | | 2.0 | | 10.0 | |
| | | White pigment | (3) | | | 10.0 | | | | 20.0 | 20.0 | | | | | 20.0 |
| | | Pearl pigment | (4) | | | | | | | | | 5.0 | | | | |
| | Lubricant | | (5) | 0.5 | 0.5 | 0.5 | 0.5 | 0.5 | 0.5 | 0.5 | 0.5 | 0.5 | 0.5 | 0.5 | | 0.5 |
| | Propylene glycol | | — | 5.0 | 5.0 | 5.0 | 5.0 | 5.0 | 5.0 | 5.0 | 5.0 | 5.0 | 5.0 | 5.0 | 5.0 | 5.0 |
| | Xanthan gum | | (6) | | | 0.1 | | 0.1 | 0.1 | 0.1 | 0.1 | 0.1 | 0.1 | | | 0.1 |
| | Perfume | Perfume A | (7) | | 1.0 | | | | 1.0 | | | 1.0 | | | 1.0 | |
| | | Perfume B | (8) | 1.0 | | | 1.0 | | | | 1.0 | | | 1.0 | | |
| | | Perfume C | (9) | | | 1.0 | | | | 1.0 | | | 1.0 | | | 1.0 |
| | | Perfume D | (10) | | | | | 3.0 | | | | | | | | |
| | Sucrose fatty acid | | (11) | | | | 5.0 | 7.0 | 5.0 | | | | | | 5.0 | 3.0 |
| | ester | | (12) | | | | | | | 5.0 | 5.0 | 5.0 | | | | |
| | | | (13) | | | | | | | | | | 5.0 | 5.0 | | 3.0 |
| | Water (purified water) | | — | 83.5 | 83.5 | 83.4 | 78.5 | 74.5 | 78.4 | 68.4 | 68.4 | 83.4 | 86.4 | 78.5 | 79.0 | 67.4 |
| Evaluation | Feathering | | | ○ | Δ | ○ | ○ | ○ | ○ | ○ | ○ | ○ | ○ | ○ | ○ | ○ |
| | Fragrance | | | X | X | X | ○ | ○ | ○ | ○ | ○ | ○ | ○ | ○ | ○ | ○ |
| | Separation of perfume | | | X | X | Δ | ○ | ○ | ○ | ○ | ○ | ○ | ○ | ○ | ○ | ○ |
| | Coagulation of pigment | | | X | X | X | ○ | ○ | ○ | ○ | ○ | ○ | ○ | ○ | ○ | ○ |
| | Writing feeling | | | ○ | ○ | ○ | ◎ | ◎ | ◎ | ◎ | ◎ | ◎ | ◎ | ◎ | ○ | ◎ |

(blend unit: % by weight)

| | | | Remark | Example | | | | | | | | | |
|---|---|---|---|---|---|---|---|---|---|---|---|---|---|
| | | | | 11 | 12 | 13 | 14 | 15 | 16 | 17 | 18 | 19 | 20 |
| Blend formation | Colorant | Blue pigment | (1) | 10.0 | 10.0 | | | | | | 10.0 | | |
| | | Yellow pigment | (2) | | | 10.0 | | | | | | 10.0 | |
| | | White pigment | (3) | | | | 20.0 | 20.0 | | | 2.0 | | 20.0 |
| | | Pearl pigment | (4) | | | | | | 5.0 | | | | |
| | Lubricant | | (5) | 0.5 | 0.5 | 0.5 | 0.5 | 0.5 | 0.5 | 0.5 | 0.5 | | 0.5 |
| | Propylene glycol | | — | 5.0 | 5.0 | 5.0 | 5.0 | 5.0 | 5.0 | 5.0 | 5.0 | 5.0 | 5.0 |
| | Xanthan gum | | (6) | | | 0.1 | 0.1 | 0.1 | 0.1 | 0.1 | | | 0.1 |
| | Perfume | Perfume A | (7) | | | 1.0 | | | 1.0 | | | 1.0 | |
| | | Perfume B | (8) | | 1.0 | | | 1.0 | | | 1.0 | | |
| | | Perfume C | (9) | | | | 1.0 | | | 1.0 | | | 1.0 |
| | | Perfume D | (10) | | 3.0 | | | | | | | | |
| | Sorbitan fatty acid | | (14) | 5.0 | 10.0 | 5.0 | | | | | | 5.0 | 3.0 |
| | ester | | (15) | | | | 5.0 | 5.0 | 5.0 | | | | |
| | | | (16) | | | | | | | 5.0 | 5.0 | | 3.0 |
| | Water (purified water) | | — | 78.5 | 71.5 | 78.4 | 68.4 | 68.4 | 83.4 | 86.4 | 78.5 | 79.0 | 67.4 |
| Evaluation | Feathering | | | ○ | ○ | ○ | ○ | ○ | ○ | ○ | ○ | ○ | ○ |
| | Fragrance | | | ○ | ○ | ○ | ○ | ○ | ○ | ○ | ○ | ○ | ○ |
| | Separation of perfume | | | ○ | ○ | ○ | ○ | ○ | ○ | ○ | ○ | ○ | ○ |
| | Coagulation of pigment | | | ○ | ○ | ○ | ○ | ○ | ○ | ○ | ○ | ○ | ○ |
| | Writing feeling | | | ◎ | ◎ | ◎ | ◎ | ◎ | ◎ | ◎ | ◎ | ○ | ◎ |

(blend unit: % by weight)

| | | | Remark | Example | | | | | | | | | |
|---|---|---|---|---|---|---|---|---|---|---|---|---|---|
| | | | | 21 | 22 | 23 | 24 | 25 | 26 | 27 | 28 | 29 | 30 |
| Blend formation | Colorant | Blue pigment | (1) | 10.0 | 10.0 | | | | | | 10.0 | | |
| | | Yellow pigment | (2) | | | 10.0 | | | | | | 10.0 | |
| | | White pigment | (3) | | | | 20.0 | 20.0 | | | 2.0 | | 20.0 |
| | | Pearl pigment | (4) | | | | | | 5.0 | | | | |
| | Lubricant | | (5) | 0.5 | 0.5 | 0.5 | 0.5 | 0.5 | 0.5 | 0.5 | 0.5 | | 0.5 |

TABLE 1-continued

| | | Remark | | | | | | | | | | |
|---|---|---|---|---|---|---|---|---|---|---|---|---|
| | Propylene glycol | — | 5.0 | 5.0 | 5.0 | 5.0 | 5.0 | 5.0 | 5.0 | 5.0 | 5.0 | 5.0 |
| | Xanthan gum | (6) | | | 0.1 | 0.1 | 0.1 | 0.1 | 0.1 | | | 0.1 |
| | Perfume    Perfume A | (7) | | | 1.0 | | | 1.0 | | | 1.0 | |
| | Perfume B | (8) | 1.0 | | | 1.0 | | | 1.0 | | | |
| | Perfume C | (9) | | | 1.0 | | 1.0 | | 1.0 | | | 1.0 |
| | Perfume D | (10) | | 3.0 | | | | | | | | |
| | Polyglycerin fatty acid | (17) | 5.0 | 10.0 | 5.0 | | | | | | 5.0 | 3.0 |
| | ester | (18) | | | | 5.0 | 5.0 | 5.0 | | | | |
| | | (19) | | | | | | | 5.0 | 5.0 | | 3.0 |
| | Water (purified water) | — | 78.5 | 71.5 | 78.4 | 68.4 | 68.4 | 83.4 | 86.4 | 78.5 | 79.0 | 67.4 |
| Evaluation | Feathering | | ○ | ○ | ○ | ○ | ○ | ○ | ○ | ○ | ○ | ○ |
| | Fragrance | | ○ | ○ | ○ | ○ | ○ | ○ | ○ | ○ | ○ | ○ |
| | Separation of perfume | | ○ | ○ | ○ | ○ | ○ | ○ | ○ | ○ | ○ | ○ |
| | Coagulation of pigment | | ○ | ○ | ○ | ○ | ○ | ○ | ○ | ○ | ○ | ○ |
| | Writing feeling | | ◎ | ◎ | ◎ | ◎ | ◎ | ◎ | ◎ | ◎ | ○ | ◎ |

(blend unit: % by weight)

| | | | Remark | Example 31 | 32 | 33 | 34 | 35 | 36 | 37 | 38 | 39 | 40 |
|---|---|---|---|---|---|---|---|---|---|---|---|---|---|
| Blend formation | Colorant | Blue pigment | (1) | 10.0 | 10.0 | | | | | | 10.0 | | |
| | | Yellow pigment | (2) | | | 10.0 | | | | | | 10.0 | |
| | | White pigment | (3) | | | | 20.0 | 20.0 | | 2.0 | | | 20.0 |
| | | Pearl pigment | (4) | | | | | | 5.0 | | | | |
| | Lubricant | | (5) | 0.5 | 0.5 | 0.5 | 0.5 | 0.5 | 0.5 | 0.5 | 0.5 | | 0.5 |
| | Propylene glycol | | — | 5.0 | 5.0 | 5.0 | 5.0 | 5.0 | 5.0 | 5.0 | 5.0 | 5.0 | 5.0 |
| | Xanthan gum | | (6) | | | 0.1 | 0.1 | 0.1 | 0.1 | 0.1 | | | 0.1 |
| | Perfume | Perfume A | (7) | | | 1.0 | | | 1.0 | | | 1.0 | |
| | | Perfume B | (8) | 1.0 | | | 1.0 | | | 1.0 | | | |
| | | Perfume C | (9) | | | 1.0 | | 1.0 | | 1.0 | | | 1.0 |
| | | Perfume D | (10) | | 3.0 | | | | | | | | |
| | Propylene glycol fatty | | (20) | 5.0 | 10.0 | 5.0 | | | | | | 5.0 | 3.0 |
| | acid ester | | (21) | | | | 5.0 | 5.0 | 5.0 | | | | |
| | | | (22) | | | | | | | 5.0 | 5.0 | | 3.0 |
| | Water (purified water) | | — | 78.5 | 71.5 | 78.4 | 68.4 | 68.4 | 83.4 | 86.4 | 78.5 | 79.0 | 67.4 |
| Evaluation | Feathering | | | ○ | ○ | ○ | ○ | ○ | ○ | ○ | ○ | ○ | ○ |
| | Fragrance | | | ○ | ○ | ○ | ○ | ○ | ○ | ○ | ○ | ○ | ○ |
| | Separation of perfume | | | ○ | ○ | ○ | ○ | ○ | ○ | ○ | ○ | ○ | ○ |
| | Coagulation of pigment | | | ○ | ○ | ○ | ○ | ○ | ○ | ○ | ○ | ○ | ○ |
| | Writing feeling | | | ◎ | ◎ | ◎ | ◎ | ◎ | ◎ | ◎ | ◎ | ○ | ◎ |

The remarks (1) to (22) shown in Table 1 mean the followings:

(1) Phthalocyanine blue (Chromofine Blue 4965 manufactured by Dainichiseika Color & Chemicals MFG. Co., Ltd.)
(2) Lacqutimine color (Golden Yellow FL2R Conc manufactured by Dainichiseika Color & Chemicals MFG. Co., Ltd.)
(3) Titanium oxide: Tipure R-900 (manufactured by Du Pont Co., Ltd.)
(4) Iriodin 303 Royal Gold (manufactured by Merck Japan Ltd.)
(5) Potassium oleate
(6) KELZAN (manufactured by Sansho Co., Ltd.)
(7) Banana perfume [Banana T-1510 (manufactured by Yamamoto Perfumery Co., Ltd.)
(8) Blueberry perfume [Blueberry V-647 (manufactured by Yamamoto Perfumery Co., Ltd.)
(9) Vanilla perfume [Vanilla BVK-3359 (manufactured by Takasogo International Corporation.)
(10) Mint perfume [Mint THP-8148 (manufactured by T. Hasegawa Co., Ltd.)
(11) DK Ester F-110 (manufactured by Daiichi Kogyo Seiyaku Co., Ltd.)
(12) Ryoto Sugar Ester (manufactured by Mitsubishi Kagaku Foods Corporation.)
(13) Sunsoft SE-16P (manufactured by Taiyo Kagaku Co., Ltd.)
(14) SL-10 (manufactured by Nikko Chemicals Co., Ltd.)
(15) Rheodol SP-S30 (manufactured by Kao Corporation)
(16) Emasol O-30 (manufactured by Kao Corporation)
(17) Hexaglyn PR-15 (manufactured by Nikko Chemicals Co., Ltd.)
(18) Decaglyn 10-0 (manufactured by Nikko Chemicals Co., Ltd.)
(19) Unigly GS-106 (manufactured by NOF Corporation.)
(20) Sunsoft No. 25P (manufactured by Taiyo Kagaku Co., Ltd.)
(21) Emalex PGML (manufactured by Nihon Emulsion Co., Ltd.)
(22) Nonion PO-100 (manufactured by NOF Corporation.)

EXAMPLES 41 TO 90

Water based ink compositions for a writing instrument were prepared according to blending formations shown in the following Table 2.

The results in the evaluation tests of the water based ink compositions are shown in Table 2 together with those of Comparative Examples 1 to 3.

The remarks (1) to (10) shown in Table 2 are the same as in Table 1, and the remarks (23) to (37) show the followings:

(23) Emalex TPM-320 (manufactured by Nihon Emulsion Co., Ltd.)
(24) Emalex TPIS-320 (manufactured by Nihon Emulsion Co., Ltd.)

(25) Emalex TPIS-350 (manufactured by Nihon Emulsion Co., Ltd.)
(26) Emalex GM-40 (manufactured by Nihon Emulsion Co., Ltd.)
(27) Glycerox HE (manufactured by Croda Japan K.K.)
(28) Unigly EVO-1114 (manufactured by NOF Corporation.)
(29) MYS-25 (manufactured by Nikko Chemicals Co., Ltd.)
(30) Nonion O-6 (manufactured by NOF Corporation.)
(31) Emalex PEIS-3 (manufactured by Nihon Emulsion Co., Ltd.)
(32) GS-6 (manufactured by Nikko Chemicals Co., Ltd.)
(33) GL-1 (manufactured by Nikko Chemicals Co., Ltd.)
(34) Rheodol 460 (manufactured by Kao Corporation)
(35) Nonion LT-221 (manufactured by NOF Corporation.)
(36) TS-30 (manufactured by Nikko Chemicals Co., Ltd.)
(37) Rheodol TW-0320 (manufactured by Kao Corporation)

TABLE 2

(blend unit: % by weight)

| | | | Remark | Comparative Example 1 | 2 | 3 | Example 41 | 42 | 43 | 44 | 45 | 46 | 47 | 48 | 49 | 50 |
|---|---|---|---|---|---|---|---|---|---|---|---|---|---|---|---|---|
| Blend formation | Colorant | Blue pigment | (1) | 10.0 | | | 10.0 | 10.0 | | | | | | 10.0 | | |
| | | Yellow pigment | (2) | | 10.0 | | | | 10.0 | | | | | | 10.0 | |
| | | White pigment | (3) | | | 10.0 | | | | 20.0 | 20.0 | | 2.0 | | | 20.0 |
| | | Pearl pigment | (4) | | | | | | | | | 5.0 | | | | |
| | Lubricant | | (5) | 0.5 | 0.5 | 0.5 | 0.5 | 0.5 | 0.5 | 0.5 | 0.5 | 0.5 | 0.5 | 0.5 | | 0.5 |
| | Propylene glycol | | — | 5.0 | 5.0 | 5.0 | 5.0 | 5.0 | 5.0 | 5.0 | 5.0 | 5.0 | 5.0 | 5.0 | 5.0 | 5.0 |
| | Xanthan gum | | (6) | | | 0.1 | | | 0.1 | 0.1 | 0.1 | 0.1 | 0.1 | | | 0.1 |
| | Perfume | Perfume A | (7) | | 1.0 | | | 1.0 | | | 1.0 | | | | 1.0 | |
| | | Perfume B | (8) | 1.0 | | | 1.0 | | | 1.0 | | | 1.0 | | | |
| | | Perfume C | (9) | | | 1.0 | | | 1.0 | | | 1.0 | | 1.0 | | 1.0 |
| | | Perfume D | (10) | | | | | 3.0 | | | | | | | | |
| | Polyoxyethylene trimethylolpropane fatty acid ester | | (23) (24) (25) | | | | 5.0 | 8.0 | 5.0 | 5.0 | 5.0 | 5.0 | 5.0 | 5.0 | 5.0 | 3.0 3.0 |
| | Water (purified water) | | — | 83.5 | 83.5 | 83.4 | 78.5 | 73.5 | 78.4 | 68.4 | 68.4 | 83.4 | 86.4 | 78.5 | 79.0 | 67.4 |
| Evaluation | Feathering | | | ○ | Δ | ○ | ○ | ○ | ○ | ○ | ○ | ○ | ○ | ○ | ○ | ○ |
| | Fragrance | | | X | X | X | ○ | ○ | ○ | ○ | ○ | ○ | ○ | ○ | ○ | ○ |
| | Separation of perfume | | | X | X | Δ | ○ | ○ | ○ | ○ | ○ | ○ | ○ | ○ | ○ | ○ |
| | Coagulation of pigment | | | X | X | X | ○ | ○ | ○ | ○ | ○ | ○ | ○ | ○ | ○ | ○ |
| | Writing feeling | | | ○ | ○ | ○ | ◎ | ◎ | ◎ | ◎ | ◎ | ◎ | ◎ | ◎ | ○ | ◎ |

(blend unit: % by weight)

| | | | Remark | Example 51 | 52 | 53 | 54 | 55 | 56 | 57 | 58 | 59 | 60 |
|---|---|---|---|---|---|---|---|---|---|---|---|---|---|
| Blend formation | Colorant | Blue pigment | (1) | 10.0 | 10.0 | | | | | | 10.0 | | |
| | | Yellow pigment | (2) | | | 10.0 | | | | | | 10.0 | |
| | | White pigment | (3) | | | | 20.0 | 20.0 | | 2.0 | | | 20.0 |
| | | Pearl pigment | (4) | | | | | | 5.0 | | | | |
| | Lubricant | | (5) | 0.5 | 0.5 | 0.5 | 0.5 | 0.5 | 0.5 | 0.5 | 0.5 | | 0.5 |
| | Propylene glycol | | — | 5.0 | 5.0 | 5.0 | 5.0 | 5.0 | 5.0 | 5.0 | 5.0 | 5.0 | 5.0 |
| | Xanthan gum | | (6) | | | 0.1 | 0.1 | 0.1 | 0.1 | 0.1 | | | 0.1 |
| | Perfume | Perfume A | (7) | | | 1.0 | | | 1.0 | | | 1.0 | |
| | | Perfume B | (8) | 1.0 | | | 1.0 | | | 1.0 | | | |
| | | Perfume C | (9) | | | | 1.0 | | | 1.0 | | | 1.0 |
| | | Perfume D | (10) | | 3.0 | | | | | | | | |
| | Polyoxyethylene glycerin fatty acid ester | | (26) (27) (28) | 5.0 | 10.0 | 5.0 5.0 | 5.0 | 5.0 | 5.0 5.0 | 5.0 | 5.0 | 5.0 | 3.0 3.0 |
| | Water (purified water) | | — | 78.5 | 71.5 | 78.4 | 68.4 | 68.4 | 83.4 | 86.4 | 78.5 | 79.0 | 67.4 |
| Evaluation | Feathering | | | ○ | ○ | ○ | ○ | ○ | ○ | ○ | ○ | ○ | ○ |
| | Fragrance | | | ○ | ○ | ○ | ○ | ○ | ○ | ○ | ○ | ○ | ○ |
| | Separation of perfume | | | ○ | ○ | ○ | ○ | ○ | ○ | ○ | ○ | ○ | ○ |
| | Coagulation of pigment | | | ○ | ○ | ○ | ○ | ○ | ○ | ○ | ○ | ○ | ○ |
| | Writing feeling | | | ◎ | ◎ | ◎ | ◎ | ◎ | ◎ | ◎ | ◎ | ○ | ◎ |

(blend unit: % by weight)

| | | | Remark | Example 61 | 62 | 63 | 64 | 65 | 66 | 67 | 68 | 69 | 70 |
|---|---|---|---|---|---|---|---|---|---|---|---|---|---|
| Blend formation | Colorant | Blue pigment | (1) | 10.0 | 10.0 | | | | | | 10.0 | | |
| | | Yellow pigment | (2) | | | 10.0 | | | | | | 10.0 | |
| | | White pigment | (3) | | | | 20.0 | 20.0 | | 2.0 | | | 20.0 |
| | | Pearl pigment | (4) | | | | | | 5.0 | | | | |
| | Lubricant | | (5) | 0.5 | 0.5 | 0.5 | 0.5 | 0.5 | 0.5 | 0.5 | 0.5 | | 0.5 |
| | Propylene glycol | | — | 5.0 | 5.0 | 5.0 | 5.0 | 5.0 | 5.0 | 5.0 | 5.0 | 5.0 | 5.0 |

TABLE 2-continued

| | | | Remark | | | | | | | | | | |
|---|---|---|---|---|---|---|---|---|---|---|---|---|---|
| | Xanthan gum | | (6) | | | 0.1 | 0.1 | 0.1 | 0.1 | 0.1 | | | 0.1 |
| | Perfume | Perfume A | (7) | | | 1.0 | | | 1.0 | | | 1.0 | |
| | | Perfume B | (8) | 1.0 | | | 1.0 | | | 1.0 | | | 1.0 |
| | | Perfume C | (9) | | | | 1.0 | | | 1.0 | | | 1.0 |
| | | Perfume D | (10) | | 3.0 | | | | | | | | |
| | Polyoxyethylene glycol | | (29) | 5.0 | 6.0 | 5.0 | | | | | | 5.0 | 3.0 |
| | fatty acid ester | | (30) | | | | 5.0 | 5.0 | 5.0 | | | | |
| | | | (31) | | | | | | | 5.0 | 5.0 | | 3.0 |
| | Water (purified water) | | — | 78.5 | 75.5 | 78.4 | 68.4 | 68.4 | 83.4 | 86.4 | 78.5 | 79.0 | 67.4 |
| Evaluation | Feathering | | | ○ | ○ | ○ | ○ | ○ | ○ | ○ | ○ | ○ | ○ |
| | Fragrance | | | ○ | ○ | ○ | ○ | ○ | ○ | ○ | ○ | ○ | ○ |
| | Separation of perfume | | | ○ | ○ | ○ | ○ | ○ | ○ | ○ | ○ | ○ | ○ |
| | Coagulation of pigment | | | ○ | ○ | ○ | ○ | ○ | ○ | ○ | ○ | ○ | ○ |
| | Writing feeling | | | ◎ | ◎ | ◎ | ◎ | ◎ | ◎ | ◎ | ◎ | ○ | ◎ |

| | | | | (blend unit: % by weight) Example | | | | | | | | | |
|---|---|---|---|---|---|---|---|---|---|---|---|---|---|
| | | | Remark | 71 | 72 | 73 | 74 | 75 | 76 | 77 | 78 | 79 | 80 |
| Blend formation | Colorant | Blue pigment | (1) | 10.0 | 10.0 | | | | | | 10.0 | | |
| | | Yellow pigment | (2) | | | 10.0 | | | | | | 10.0 | |
| | | White pigment | (3) | | | | 20.0 | 20.0 | | 2.0 | | | 20.0 |
| | | Pearl pigment | (4) | | | | | | 5.0 | | | | |
| | Lubricant | | (5) | 0.5 | 0.5 | 0.5 | 0.5 | 0.5 | 0.5 | 0.5 | 0.5 | | 0.5 |
| | Propylene glycol | | — | 5.0 | 5.0 | 5.0 | 5.0 | 5.0 | 5.0 | 5.0 | 5.0 | 5.0 | 5.0 |
| | Xanthan gum | | (6) | | | 0.1 | 0.1 | 0.1 | 0.1 | 0.1 | | | 0.1 |
| | Perfume | Perfume A | (7) | | | 1.0 | | | 1.0 | | | 1.0 | |
| | | Perfume B | (8) | 1.0 | | | 1.0 | | | 1.0 | | | 1.0 |
| | | Perfume C | (9) | | | | 1.0 | | | 1.0 | | | 1.0 |
| | | Perfume D | (10) | | 3.0 | | | | | | | | |
| | Polyoxyethylene sorbit | | (32) | 5.0 | 6.0 | 5.0 | | | | | | 5.0 | 3.0 |
| | fatty acid ester | | (33) | | | | 5.0 | 5.0 | 5.0 | | | | |
| | | | (34) | | | | | | | 5.0 | 5.0 | | 3.0 |
| | Water (purified water) | | — | 78.5 | 75.5 | 78.4 | 68.4 | 68.4 | 83.4 | 86.4 | 78.5 | 79.0 | 67.4 |
| Evaluation | Feathering | | | ○ | ○ | ○ | ○ | ○ | ○ | ○ | ○ | ○ | ○ |
| | Fragrance | | | ○ | ○ | ○ | ○ | ○ | ○ | ○ | ○ | ○ | ○ |
| | Separation of perfume | | | ○ | ○ | ○ | ○ | ○ | ○ | ○ | ○ | ○ | ○ |
| | Coagulation of pigment | | | ○ | ○ | ○ | ○ | ○ | ○ | ○ | ○ | ○ | ○ |
| | Writing feeling | | | ◎ | ◎ | ◎ | ◎ | ◎ | ◎ | ◎ | ◎ | ○ | ◎ |

| | | | | (blend unit: % by weight) Example | | | | | | | | | |
|---|---|---|---|---|---|---|---|---|---|---|---|---|---|
| | | | Remark | 81 | 82 | 83 | 84 | 85 | 86 | 87 | 88 | 89 | 90 |
| Blend formation | Colorant | Blue pigment | (1) | 10.0 | 10.0 | | | | | | 10.0 | | |
| | | Yellow pigment | (2) | | | 10.0 | | | | | | 10.0 | |
| | | White pigment | (3) | | | | 20.0 | 20.0 | | 2.0 | | | 20.0 |
| | | Pearl pigment | (4) | | | | | | 5.0 | | | | |
| | Lubricant | | (5) | 0.5 | 0.5 | 0.5 | 0.5 | 0.5 | 0.5 | 0.5 | 0.5 | | 0.5 |
| | Propylene glycol | | — | 5.0 | 5.0 | 5.0 | 5.0 | 5.0 | 5.0 | 5.0 | 5.0 | 5.0 | 5.0 |
| | Xanthan gum | | (6) | | | 0.1 | 0.1 | 0.1 | 0.1 | 0.1 | | | 0.1 |
| | Perfume | Perfume A | (7) | | | 1.0 | | | 1.0 | | | 1.0 | |
| | | Perfume B | (8) | 1.0 | | | 1.0 | | | 1.0 | | | 1.0 |
| | | Perfume C | (9) | | | | 1.0 | | | 1.0 | | | 1.0 |
| | | Perfume D | (10) | | 3.0 | | | | | | | | |
| | Polyoxyethylene sorbit | | (35) | 5.0 | 10.0 | 5.0 | | | | | | 5.0 | 3.0 |
| | fatty acid ester | | (36) | | | | 5.0 | 5.0 | 5.0 | | | | |
| | | | (37) | | | | | | | 5.0 | 5.0 | | 3.0 |
| | Water (purified water) | | — | 78.5 | 71.5 | 78.4 | 68.4 | 68.4 | 83.4 | 86.4 | 78.5 | 79.0 | 67.4 |
| Evaluation | Feathering | | | ○ | ○ | ○ | ○ | ○ | ○ | ○ | ○ | ○ | ○ |
| | Fragrance | | | ○ | ○ | ○ | ○ | ○ | ○ | ○ | ○ | ○ | ○ |
| | Separation of perfume | | | ○ | ○ | ○ | ○ | ○ | ○ | ○ | ○ | ○ | ○ |
| | Coagulation of pigment | | | ○ | ○ | ○ | ○ | ○ | ○ | ○ | ○ | ○ | ○ |
| | Writing feeling | | | ◎ | ◎ | ◎ | ◎ | ◎ | ◎ | ◎ | ◎ | ○ | ◎ |

EXAMPLES 91 TO 130

Water based ink compositions for a writing instrument were prepared according to blending formation shown in the following Table 3.

The results in the evaluation tests of the water based ink compositions are shown in Table 3 together with those of Comparative Examples 1 to 3.

The remarks (1) to (10) shown in Table 3 are the same as in Table 1, and the remarks (38) to (49) show the followings:

(38) Nonion S-208 (manufactured by NOF Corporation.)
(39) Emulgen 930 (manufactured by Kao Corporation)
(40) Noigen EA-152 (manufactured by Daiichi Kogyo Seiyaku Co., Ltd.)
(41) BO-20 (manufactured by Nikko Chemicals Co., Ltd.)
(42) Nonion B-210 (manufactured by NOF Corporation.)

(43) BD-10 (manufactured by Nikko Chemicals Co., Ltd.)

(44) EO 10 mole adducts of phytosterol: BPS-10 (manufactured by Nikko Chemicals Co., Ltd.)

(45) EO 5 mole adducts of cholesterol: CS-5 (manufactured by Nihon Emulsion Co., Ltd.)

(46) EO 20 mole adducts of cholesterol: CS-20 (manufactured by Nihon Emulsion Co., Ltd.)

(47) Polycol WH150 (manufactured by Croda Japan K.K.)

(48) Polycol 5 (manufactured by Croda Japan K.K.)

(49) BWA-40 (manufactured by Nikko Chemicals Co., Ltd.)

TABLE 3

(blend unit: % by weight)

| | | | | Comparative Example | | | Example | | | | | | | | | |
|---|---|---|---|---|---|---|---|---|---|---|---|---|---|---|---|---|
| | | | Remark | 1 | 2 | 3 | 91 | 92 | 93 | 94 | 95 | 96 | 97 | 98 | 99 | 100 |
| Blend formation | Colorant | Blue pigment | (1) | 10.0 | | | 10.0 | 10.0 | | | | | | 10.0 | | |
| | | Yellow pigment | (2) | | 10.0 | | | | 10.0 | | | | | | 10.0 | |
| | | White pigment | (3) | | | 10.0 | | | | 20.0 | 20.0 | | 2.0 | | | 20.0 |
| | | Pearl pigment | (4) | | | | | | | | | 5.0 | | | | |
| | Lubricant | | (5) | 0.5 | 0.5 | 0.5 | 0.5 | 0.5 | 0.5 | 0.5 | 0.5 | 0.5 | 0.5 | 0.5 | | 0.5 |
| | Propylene glycol | | — | 5.0 | 5.0 | 5.0 | 5.0 | 5.0 | 5.0 | 5.0 | 5.0 | 5.0 | 5.0 | 5.0 | 5.0 | 5.0 |
| | Xanthan gum | | (6) | | | 0.1 | | 0.1 | 0.1 | 0.1 | 0.1 | 0.1 | | | | 0.1 |
| | Perfume | Perfume A | (7) | | 1.0 | | | | 1.0 | | | 1.0 | | | 1.0 | |
| | | Perfume B | (8) | 1.0 | | | 1.0 | | | | 1.0 | | | 1.0 | | |
| | | Perfume C | (9) | | | 1.0 | | | | 1.0 | | | 1.0 | | | 1.0 |
| | | Perfume D | (10) | | | | | 3.0 | | | | | | | | |
| | Polyoxyethylene alkylphenyl ether | | (38) | | | | 5.0 | 10.0 | 5.0 | | | | | | 5.0 | 3.0 |
| | | | (39) | | | | | | | 5.0 | 5.0 | 5.0 | | | | |
| | | | (40) | | | | | | | | | | 5.0 | 5.0 | | 3.0 |
| | Water (purified water) | | — | 83.5 | 83.5 | 83.4 | 78.5 | 71.5 | 78.4 | 68.4 | 68.4 | 83.4 | 86.4 | 78.5 | 79.0 | 67.4 |
| Evaluation | Feathering | | | ○ | Δ | ○ | ○ | ○ | ○ | ○ | ○ | ○ | ○ | ○ | ○ | ○ |
| | Fragrance | | | X | X | X | ○ | ○ | ○ | ○ | ○ | ○ | ○ | ○ | ○ | ○ |
| | Separation of perfume | | | X | X | Δ | ○ | ○ | ○ | ○ | ○ | ○ | ○ | ○ | ○ | ○ |
| | Coagulation of pigment | | | X | X | X | ○ | ○ | ○ | ○ | ○ | ○ | ○ | ○ | ○ | ○ |
| | Writing feeling | | | ○ | ○ | ○ | ◎ | ◎ | ◎ | ◎ | ◎ | ◎ | ◎ | ◎ | ○ | ◎ |

(blend unit: % by weight)

| | | | | Example | | | | | | | | | |
|---|---|---|---|---|---|---|---|---|---|---|---|---|---|
| | | | Remark | 101 | 102 | 103 | 104 | 105 | 106 | 107 | 108 | 109 | 110 |
| Blend formation | Colorant | Blue pigment | (1) | 10.0 | 10.0 | | | | | | 10.0 | | |
| | | Yellow pigment | (2) | | | 10.0 | | | | | | 10.0 | |
| | | White pigment | (3) | | | | 20.0 | 20.0 | | 2.0 | | | 20.0 |
| | | Pearl pigment | (4) | | | | | | 5.0 | | | | |
| | Lubricant | | (5) | 0.5 | 0.5 | 0.5 | 0.5 | 0.5 | 0.5 | 0.5 | 0.5 | | 0.5 |
| | Propylene glycol | | — | 5.0 | 5.0 | 5.0 | 5.0 | 5.0 | 5.0 | 5.0 | 5.0 | 5.0 | 5.0 |
| | Xanthan gum | | (6) | | | 0.1 | 0.1 | 0.1 | 0.1 | 0.1 | | | 0.1 |
| | Perfume | Perfume A | (7) | | | 1.0 | | | 1.0 | | | 1.0 | |
| | | Perfume B | (8) | 1.0 | | | | 1.0 | | | 1.0 | | |
| | | Perfume C | (9) | | | | 1.0 | | | 1.0 | | | 1.0 |
| | | Perfume D | (10) | | 3.0 | | | | | | | | |
| | Polyoxyethylene alkyl ether | | (41) | 5.0 | 10.0 | 5.0 | | | | | | 5.0 | 3.0 |
| | | | (42) | | | | 5.0 | 5.0 | 5.0 | | | | |
| | | | (43) | | | | | | | 5.0 | 5.0 | | 3.0 |
| | Water (purified water) | | — | 78.5 | 71.5 | 78.4 | 68.4 | 68.4 | 83.4 | 86.4 | 78.5 | 79.0 | 67.4 |
| Evaluation | Feathering | | | ○ | ○ | ○ | ○ | ○ | ○ | ○ | ○ | ○ | ○ |
| | Fragrance | | | ○ | ○ | ○ | ○ | ○ | ○ | ○ | ○ | ○ | ○ |
| | Separation of perfume | | | ○ | ○ | ○ | ○ | ○ | ○ | ○ | ○ | ○ | ○ |
| | Coagulation of pigment | | | ○ | ○ | ○ | ○ | ○ | ○ | ○ | ○ | ○ | ○ |
| | Writing feeling | | | ◎ | ◎ | ◎ | ◎ | ◎ | ◎ | ◎ | ◎ | ○ | ◎ |

(blend unit: % by weight)

| | | | | Example | | | | | | | | | |
|---|---|---|---|---|---|---|---|---|---|---|---|---|---|
| | | | Remark | 111 | 112 | 113 | 114 | 115 | 116 | 117 | 118 | 119 | 120 |
| Blend formation | Colorant | Blue pigment | (1) | 10.0 | 10.0 | | | | | | 10.0 | | |
| | | Yellow pigment | (2) | | | 10.0 | | | | | | 10.0 | |
| | | White pigment | (3) | | | | 20.0 | 20.0 | | 2.0 | | | 20.0 |
| | | Pearl pigment | (4) | | | | | | 5.0 | | | | |
| | Lubricant | | (5) | 0.5 | 0.5 | 0.5 | 0.5 | 0.5 | 0.5 | 0.5 | 0.5 | | 0.5 |
| | Propylene glycol | | — | 5.0 | 5.0 | 5.0 | 5.0 | 5.0 | 5.0 | 5.0 | 5.0 | 5.0 | 5.0 |
| | Xanthan gum | | (6) | | | 0.1 | 0.1 | 0.1 | 0.1 | 0.1 | | | 0.1 |
| | Perfume | Perfume A | (7) | | | 1.0 | | | 1.0 | | | 1.0 | |
| | | Perfume B | (8) | 1.0 | | | | 1.0 | | | 1.0 | | |
| | | Perfume C | (9) | | | | 1.0 | | | 1.0 | | | 1.0 |

TABLE 3-continued

| | | | | | | | | | | | | |
|---|---|---|---|---|---|---|---|---|---|---|---|---|
| | Perfume D | (10) | | 3.0 | | | | | | | | |
| | Polyoxyethylene | (44) | 5.0 | 10.0 | 5.0 | | | | | | 5.0 | 3.0 |
| | cholesteryl ether | (45) | | | | 5.0 | 5.0 | 5.0 | | | | |
| | | (46) | | | | | | | 5.0 | 5.0 | | 3.0 |
| | Water (purified water) | — | 78.5 | 71.5 | 78.4 | 68.4 | 68.4 | 83.4 | 86.4 | 78.5 | 79.0 | 67.4 |
| Evaluation | Feathering | | ○ | ○ | ○ | ○ | ○ | ○ | ○ | ○ | ○ | ○ |
| | Fragrance | | ○ | ○ | ○ | ○ | ○ | ○ | ○ | ○ | ○ | ○ |
| | Separation of perfume | | ○ | ○ | ○ | ○ | ○ | ○ | ○ | ○ | ○ | ○ |
| | Coagulation of pigment | | ○ | ○ | ○ | ○ | ○ | ○ | ○ | ○ | ○ | ○ |
| | Writing feeling | | ◎ | ◎ | ◎ | ◎ | ◎ | ◎ | ◎ | ◎ | ○ | ◎ |

| | | | (blend unit: % by weight) | | | | | | | | | |
|---|---|---|---|---|---|---|---|---|---|---|---|---|
| | | | Example | | | | | | | | | |
| | | Remark | 121 | 122 | 123 | 124 | 125 | 126 | 127 | 128 | 129 | 130 |
| Blend formation | Colorant Blue pigment | (1) | 10.0 | 10.0 | | | | | | 10.0 | | |
| | Yellow pigment | (2) | | | 10.0 | | | | 2.0 | | 10.0 | 20.0 |
| | White pigment | (3) | | | | 20.0 | 20.0 | | | | | |
| | Pearl pigment | (4) | | | | | | 5.0 | | | | |
| | Lubricant | (5) | 0.5 | 0.5 | 0.5 | 0.5 | 0.5 | 0.5 | 0.5 | 0.5 | | 0.5 |
| | Propylene glycol | — | 5.0 | 5.0 | 5.0 | 5.0 | 5.0 | 5.0 | 5.0 | 5.0 | 5.0 | 5.0 |
| | Xanthan gum | (6) | | | 0.1 | 0.1 | 0.1 | 0.1 | 0.1 | | | 0.1 |
| | Perfume Perfume A | (7) | | | | 1.0 | | | 1.0 | | 1.0 | |
| | Perfume B | (8) | 1.0 | | | | 1.0 | | | 1.0 | | |
| | Perfume C | (9) | | | | | 1.0 | | 1.0 | | | 1.0 |
| | Perfume D | (10) | | 3.0 | | | | | | | | |
| | Polyoxyethylene | (47) | 5.0 | 6.0 | 5.0 | | | | | | 5.0 | 3.0 |
| | lanolin, lanolin | (48) | | | | 5.0 | 5.0 | 5.0 | | | | |
| | alcohol | (49) | | | | | | | 5.0 | 5.0 | | 3.0 |
| | Water (purified water) | — | 78.5 | 75.5 | 78.4 | 68.4 | 68.4 | 83.4 | 86.4 | 78.5 | 79.0 | 67.4 |
| Evaluation | Feathering | | ○ | ○ | ○ | ○ | ○ | ○ | ○ | ○ | ○ | ○ |
| | Fragrance | | ○ | ○ | ○ | ○ | ○ | ○ | ○ | ○ | ○ | ○ |
| | Separation of perfume | | ○ | ○ | ○ | ○ | ○ | ○ | ○ | ○ | ○ | ○ |
| | Coagulation of pigment | | ○ | ○ | ○ | ○ | ○ | ○ | ○ | ○ | ○ | ○ |
| | Writing feeling | | ◎ | ◎ | ◎ | ◎ | ◎ | ◎ | ◎ | ◎ | ○ | ◎ |

EXAMPLES 131 TO 150

Water based ink compositions for a writing instrument were prepared according to blending formations shown in the following Table 4.

The results in the evaluation tests of the water based ink compositions are shown in Table 4 together with those of Comparative Examples 1 to 3.

The remarks (1) to (10) shown in Table 4 are the same as in Table 1, and the remarks (50) to (55) show the followings:

(50) Pronon 104 (manufactured by NOF Corporation.)
(51) Pronon 204 (manufactured by NOF Corporation.)
(52) Pronon 208 (manufactured by NOF Corporation.)
(53) Nonion A-13P (manufactured by NOF Corporation.)
(54) Unisafe 1P-4 (manufactured by NOF Corporation.)
(55) Hepol A-0638 (manufactured by Toho Chemical Industry Co., Ltd.)

TABLE 4

| | | | (blend unit: % by weight) | | | | | | | | | | | | | |
|---|---|---|---|---|---|---|---|---|---|---|---|---|---|---|---|---|
| | | | Comparative Example | | | Example | | | | | | | | | | |
| | | Remark | 1 | 2 | 3 | 131 | 132 | 133 | 134 | 135 | 136 | 137 | 138 | 139 | 140 |
| Blend formation | Colorant Blue pigment | (1) | 10.0 | | | 10.0 | 10.0 | | | | | | 10.0 | | |
| | Yellow pigment | (2) | | 10.0 | | | | 10.0 | | | | 2.0 | | 10.0 | |
| | White pigment | (3) | | | 10.0 | | | | 20.0 | 20.0 | | | | | 20.0 |
| | Pearl pigment | (4) | | | | | | | | | 5.0 | | | | |
| | Lubricant | (5) | 0.5 | 0.5 | 0.5 | 0.5 | 0.5 | 0.5 | 0.5 | 0.5 | 0.5 | 0.5 | 0.5 | | 0.5 |
| | Propylene glycol | — | 5.0 | 5.0 | 5.0 | 5.0 | 5.0 | 5.0 | 5.0 | 5.0 | 5.0 | 5.0 | 5.0 | 5.0 | 5.0 |
| | Xanthan gum | (6) | | | 0.1 | | | 0.1 | 0.1 | 0.1 | 0.1 | 0.1 | | | 0.1 |
| | Perfume Perfume A | (7) | | 1.0 | | | 1.0 | | | | 1.0 | | | 1.0 | |
| | Perfume B | (8) | 1.0 | | | 1.0 | | | 1.0 | | | 1.0 | | | |
| | Perfume C | (9) | | | 1.0 | | | | | 1.0 | | 1.0 | | | 1.0 |
| | Perfume D | (10) | | | | | 3.0 | | | | | | | | |
| | Polyoxyethylene | (50) | | | | 5.0 | 10.0 | 5.0 | | | | | | 5.0 | 3.0 |
| | polyoxypropylene glycol | (51) | | | | | | | 5.0 | 5.0 | 5.0 | | | | |
| | ether | (52) | | | | | | | | | | 5.0 | 5.0 | | 3.0 |
| | Water (purified water) | — | 83.5 | 83.5 | 83.4 | 78.5 | 71.5 | 78.4 | 68.4 | 68.4 | 83.4 | 86.4 | 78.5 | 79.0 | 67.4 |
| Evaluation | Feathering | | ○ | Δ | ○ | ○ | ○ | ○ | ○ | ○ | ○ | ○ | ○ | ○ | ○ |
| | Fragrance | | X | X | X | ○ | ○ | ○ | ○ | ○ | ○ | ○ | ○ | ○ | ○ |

TABLE 4-continued

| | | | | | | | | | | | | | | |
|---|---|---|---|---|---|---|---|---|---|---|---|---|---|---|
| Separation of perfume | X | X | Δ | ○ | ○ | ○ | ○ | ○ | ○ | ○ | ○ | ○ | ○ |
| Coagulation of pigment | X | X | X | ○ | ○ | ○ | ○ | ○ | ○ | ○ | ○ | ○ | ○ |
| Writing feeling | ○ | ○ | ○ | ⊚ | ⊚ | ⊚ | ⊚ | ⊚ | ⊚ | ⊚ | ⊚ | ○ | ⊚ |

(blend unit: % by weight)

| | | | | Example |
|---|---|---|---|---|
| | | | Remark | 141 | 142 | 143 | 144 | 145 | 146 | 147 | 148 | 149 | 150 |
|---|---|---|---|---|---|---|---|---|---|---|---|---|---|
| Blend formation | Colorant | Blue pigment | (1) | 10.0 | 10.0 | | | | | | 10.0 | | |
| | | Yellow pigment | (2) | | | 10.0 | | | | | | 10.0 | |
| | | White pigment | (3) | | | | 20.0 | 20.0 | | 2.0 | | | 20.0 |
| | | Pearl pigment | (4) | | | | | | 5.0 | | | | |
| | Lubricant | | (5) | 0.5 | 0.5 | 0.5 | 0.5 | 0.5 | 0.5 | 0.5 | 0.5 | | 0.5 |
| | Propylene glycol | | — | 5.0 | 5.0 | 5.0 | 5.0 | 5.0 | 5.0 | 5.0 | 5.0 | 5.0 | 5.0 |
| | Xanthan gum | | (6) | | | 0.1 | 0.1 | 0.1 | 0.1 | 0.1 | | | 0.1 |
| | Perfume | Perfume A | (7) | | | | 1.0 | | | 1.0 | | 1.0 | |
| | | Perfume B | (8) | 1.0 | | | | 1.0 | | | 1.0 | | |
| | | Perfume C | (9) | | | | | 1.0 | | 1.0 | | | 1.0 |
| | | Perfume D | (10) | | 3.0 | | | | | | | | |
| | Polyoxyethylene polyoxypropylene alkyl ether | | (53) (54) (55) | 5.0 | 6.0 | 5.0 | 5.0 | 5.0 | 5.0 | 5.0 | 5.0 | 5.0 | 3.0 3.0 |
| | Water (purified water) | | — | 78.5 | 75.5 | 78.4 | 68.4 | 68.4 | 83.4 | 86.4 | 78.5 | 79.0 | 67.4 |
| Evaluation | Feathering | | | ○ | ○ | ○ | ○ | ○ | ○ | ○ | ○ | ○ | ○ |
| | Fragrance | | | ○ | ○ | ○ | ○ | ○ | ○ | ○ | ○ | ○ | ○ |
| | Separation of perfume | | | ○ | ○ | ○ | ○ | ○ | ○ | ○ | ○ | ○ | ○ |
| | Coagulation of pigment | | | ○ | ○ | ○ | ○ | ○ | ○ | ○ | ○ | ○ | ○ |
| | Writing feeling | | | ⊚ | ⊚ | ⊚ | ⊚ | ⊚ | ⊚ | ⊚ | ⊚ | ○ | ⊚ |

EXAMPLES 151 TO 160

Water based ink compositions for a writing instrument were prepared according to blending formations shown in the following Table 5.

The results in the evaluation tests of the water based ink compositions are shown in Table 5 together with those of Comparative Examples 1 to 3.

The remarks (1) to (10) shown in Table 5 are the same as in Table 1, and the remarks (56) to (58) show the followings:

(56) Polyoxyethylene castor oil: CO-40TX (manufactured by Nikko Chemicals Co., Ltd.)
(57) Polyoxyethylene hardened castor oil: Uniox HC-10 (manufactured by NOF Corporation.)
(58) Polyoxyethylene hardened castor oil: Emanon CH-80 (manufactured by Kao Corporation)

TABLE 5

(blend unit: % by weight)

| | | | | Comparative Example | | | Example | | | | | | | | | |
|---|---|---|---|---|---|---|---|---|---|---|---|---|---|---|---|---|
| | | | Remark | 1 | 2 | 3 | 151 | 152 | 153 | 154 | 155 | 156 | 157 | 158 | 159 | 160 |
| Blend formation | Colorant | Blue pigment | (1) | 10.0 | | | 10.0 | 10.0 | | | | | | 10.0 | | |
| | | Yellow pigment | (2) | | 10.0 | | | | 10.0 | | | | | | 10.0 | |
| | | White pigment | (3) | | | 10.0 | | | | 20.0 | 20.0 | | 2.0 | | | 20.0 |
| | | Pearl pigment | (4) | | | | | | | | | 5.0 | | | | |
| | Lubricant | | (5) | 0.5 | 0.5 | 0.5 | 0.5 | 0.5 | 0.5 | 0.5 | 0.5 | 0.5 | 0.5 | 0.5 | | 0.5 |
| | Propylene glycol | | — | 5.0 | 5.0 | 5.0 | 5.0 | 5.0 | 5.0 | 5.0 | 5.0 | 5.0 | 5.0 | 5.0 | 5.0 | 5.0 |
| | Xanthan gum | | (6) | | | 0.1 | | | 0.1 | 0.1 | 0.1 | 0.1 | 0.1 | | | 0.1 |
| | Perfume | Perfume A | (7) | | 1.0 | | | 1.0 | | | | 1.0 | | | 1.0 | |
| | | Perfume B | (8) | 1.0 | | | 1.0 | | | 1.0 | | | 1.0 | | | |
| | | Perfume C | (9) | | | 1.0 | | | | | 1.0 | | 1.0 | | | 1.0 |
| | | Perfume D | (10) | | | | | 3.0 | | | | | | | | |
| | Polyoxyethylene castor oil, polyoxyethylene hardened castor oil, | | (56) (57) (58) | | | | 5.0 | 6.0 | 5.0 | 5.0 | 5.0 | 5.0 | 5.0 | 5.0 | 5.0 | 3.0 3.0 |
| | Water (purified water) | | — | 83.5 | 83.5 | 83.4 | 78.5 | 75.5 | 78.4 | 68.4 | 68.4 | 83.4 | 86.4 | 78.5 | 79.0 | 67.4 |
| Evaluation | Feathering | | | ○ | Δ | ○ | ○ | ○ | ○ | ○ | ○ | ○ | ○ | ○ | ○ | ○ |
| | Fragrance | | | X | X | X | ○ | ○ | ○ | ○ | ○ | ○ | ○ | ○ | ○ | ○ |
| | Separation of perfume | | | X | X | Δ | ○ | ○ | ○ | ○ | ○ | ○ | ○ | ○ | ○ | ○ |
| | Coagulation of pigment | | | X | X | X | ○ | ○ | ○ | ○ | ○ | ○ | ○ | ○ | ○ | ○ |
| | Writing feeling | | | ○ | ○ | ○ | ⊚ | ⊚ | ⊚ | ⊚ | ⊚ | ⊚ | ⊚ | ⊚ | ○ | ⊚ |

EXAMPLES 161 TO 170

Water based ink compositions for a writing instrument were prepared according to blending formations shown in the following Table 6.

The results in the evaluation tests of the water based ink compositions are shown in Table 6 together with those of Comparative Examples 1 to 3.

The remarks (1) to (10) shown in Table 6 are the same as in Table 1, and the remarks (59) to (61) show the followings:

(59) Emalex RWL-140 (manufactured by Nihon Emulsion Co., Ltd.)

(60) Emalex RWIS-160 (manufactured by Nihon Emulsion Co., Ltd.)

(61) Emalex RWIS-330 (manufactured by Nihon Emulsion Co., Ltd.)

TABLE 6

(blend unit: % by weight)

| | | | | Comparative Example | | | Example | | | | | | | | | |
|---|---|---|---|---|---|---|---|---|---|---|---|---|---|---|---|---|
| | | | Remark | 1 | 2 | 3 | 161 | 162 | 163 | 164 | 165 | 166 | 167 | 168 | 169 | 170 |
| Blend formation | Colorant | Blue pigment | (1) | 10.0 | | | 10.0 | 10.0 | | | | | | 10.0 | | |
| | | Yellow pigment | (2) | | 10.0 | | | | 10.0 | | | | | | 10.0 | |
| | | White pigment | (3) | | | 10.0 | | | | 20.0 | 20.0 | | 2.0 | | | 20.0 |
| | | Pearl pigment | (4) | | | | | | | | | 5.0 | | | | |
| | Lubricant | | (5) | 0.5 | 0.5 | 0.5 | 0.5 | 0.5 | 0.5 | 0.5 | 0.5 | 0.5 | 0.5 | 0.5 | | 0.5 |
| | Propylene glycol | | — | 5.0 | 5.0 | 5.0 | 5.0 | 5.0 | 5.0 | 5.0 | 5.0 | 5.0 | 5.0 | 5.0 | 5.0 | 5.0 |
| | Xanthan gum | | (6) | | | 0.1 | | | 0.1 | 0.1 | 0.1 | 0.1 | 0.1 | | | 0.1 |
| | Perfume | Perfume A | (7) | | 1.0 | | | | 1.0 | | | 1.0 | | | 1.0 | |
| | | Perfume B | (8) | 1.0 | | | 1.0 | | | 1.0 | | | | 1.0 | | |
| | | Perfume C | (9) | | | 1.0 | | | | 1.0 | | 1.0 | | | | 1.0 |
| | | Perfume D | (10) | | | | | 3.0 | | | | | | | | |
| | Fatty acid | | (59) | | | | 5.0 | 6.0 | 5.0 | | | | | | 5.0 | 3.0 |
| | polyoxyethylene | | (60) | | | | | | | 5.0 | 5.0 | 5.0 | | | | |
| | hardened castor oil | | (61) | | | | | | | | | | 5.0 | 5.0 | | 3.0 |
| | Water (purified water) | | — | 83.5 | 83.5 | 83.4 | 78.5 | 75.5 | 78.4 | 68.4 | 68.4 | 83.4 | 86.4 | 78.5 | 79.0 | 67.4 |
| Evaluation | Feathering | | | ○ | Δ | ○ | ○ | ○ | ○ | ○ | ○ | ○ | ○ | ○ | ○ | ○ |
| | Fragrance | | | X | X | X | ○ | ○ | ○ | ○ | ○ | ○ | ○ | ○ | ○ | ○ |
| | Separation of perfume | | | X | X | Δ | ○ | ○ | ○ | ○ | ○ | ○ | ○ | ○ | ○ | ○ |
| | Coagulation of pigment | | | X | X | X | ○ | ○ | ○ | ○ | ○ | ○ | ○ | ○ | ○ | ○ |
| | Writing feeling | | | ○ | ○ | ○ | ⊙ | ⊙ | ⊙ | ⊙ | ⊙ | ⊙ | ⊙ | ⊙ | ○ | ⊙ |

EXAMPLES 171 TO 180

Water based ink compositions for a writing instrument were prepared according to blending formations shown in the following Table 7.

The results in the evaluation tests of the water based ink compositions are shown in Table 7 together with those of Comparative Examples 1 to 3.

The remarks (1) to (10) shown in Table 7 are the same as in Table 1, and the remarks (61) to (64) show the followings:

(61) TAMNO-5 (manufactured by Nikko Chemicals Co., Ltd.)

(62) Nymid F-215 (manufactured by NOF Corporation.)

(63) TAMDO-5 (manufactured by Nikko Chemicals Co., Ltd.)

TABLE 7

(blend unit: % by weight)

| | | | | Comparative Example | | | Example | | | | | | | | | |
|---|---|---|---|---|---|---|---|---|---|---|---|---|---|---|---|---|
| | | | Remark | 1 | 2 | 3 | 171 | 172 | 173 | 174 | 175 | 176 | 177 | 178 | 179 | 180 |
| Blend formation | Colorant | Blue pigment | (1) | 10.0 | | | 10.0 | 10.0 | | | | | | 10.0 | | |
| | | Yellow pigment | (2) | | 10.0 | | | | 10.0 | | | | | | 10.0 | |
| | | White pigment | (3) | | | 10.0 | | | | 20.0 | 20.0 | | 20.0 | | | 20.0 |
| | | Pearl pigment | (4) | | | | | | | | | 5.0 | | | | |
| | Lubricant | | (5) | 0.5 | 0.5 | 0.5 | 0.5 | 0.5 | 0.5 | 0.5 | 0.5 | 0.5 | 0.5 | 0.5 | | 0.5 |
| | Propylene glycol | | — | 5.0 | 5.0 | 5.0 | 5.0 | 5.0 | 5.0 | 5.0 | 5.0 | 5.0 | 5.0 | 5.0 | 5.0 | 5.0 |
| | Xanthan gum | | (6) | | | 0.1 | | | 0.1 | 0.1 | 0.1 | 0.1 | 0.1 | | | 0.1 |
| | Perfume | Perfume A | (7) | | 1.0 | | | | 1.0 | | | 1.0 | | | 1.0 | |
| | | Perfume B | (8) | 1.0 | | | 1.0 | | | 1.0 | | | | 1.0 | | |
| | | Perfume C | (9) | | | 1.0 | | | | 1.0 | | 1.0 | | | | 1.0 |
| | | Perfume D | (10) | | | | | 3.0 | | | | | | | | |
| | Polyoxyethylene | | (62) | | | | 5.0 | 10.0 | 5.0 | | | | | | 5.0 | 3.0 |
| | alkylamine fatty acid | | (63) | | | | | | | 5.0 | 5.0 | 5.0 | | | | |
| | amide | | (64) | | | | | | | | | | 5.0 | 5.0 | | 3.0 |

TABLE 7-continued

| | | | Comparative Example | | | (blend unit: % by weight) Example | | | | | | | | | |
|---|---|---|---|---|---|---|---|---|---|---|---|---|---|---|---|
| | | Remark | 1 | 2 | 3 | 171 | 172 | 173 | 174 | 175 | 176 | 177 | 178 | 179 | 180 |
| Evaluation | Water (purified water) | — | 83.5 | 83.5 | 83.4 | 78.5 | 71.5 | 78.4 | 68.4 | 68.4 | 83.4 | 86.4 | 78.5 | 79.0 | 67.4 |
| | Feathering | | ○ | Δ | ○ | ○ | ○ | ○ | ○ | ○ | ○ | ○ | ○ | ○ | ○ |
| | Fragrance | | X | X | X | ○ | ○ | ○ | ○ | ○ | ○ | ○ | ○ | ○ | ○ |
| | Separation of perfume | | X | X | Δ | ○ | ○ | ○ | ○ | ○ | ○ | ○ | ○ | ○ | ○ |
| | Coagulation of pigment | | X | X | X | ○ | ○ | ○ | ○ | ○ | ○ | ○ | ○ | ○ | ○ |
| | Writing feeling | | ○ | ○ | ○ | ⊚ | ⊚ | ⊚ | ⊚ | ⊚ | ⊚ | ⊚ | ⊚ | ○ | ⊚ |

Consideration of Tables 1 to 7

As apparent from the results shown in Tables 1 to 7 described above, it has been confirmed in Examples 1 to 180 falling in the scope of the present invention as compared with Comparative Examples 1 to 3 falling outside the scope of the present invention, that feathering of the ink is not observed and fragrance is excellent and that separation of the perfume and coagulation of the pigment are not caused and very smooth writing feeling is obtained.

In contrast with this, Comparative Examples 1 to 3 are cases in which not added is at least one of the nonionic surfactants which are the essential components in the present invention and have a function as a feathering inhibitor, a function as a fragrance durability-improving agent and a function for inhibiting separation of the perfume, and it has been confirmed that in these cases, all evaluation items of feathering of the ink, fragrance, separation of the perfume, coagulation of the pigment and writing feeling can not be satisfied.

INDUSTRIAL APPLICABILITY

According to the present invention, obtained is a water based ink composition for a writing instrument which is less liable to cause feathering of the lines and has durability of fragrance and in which a perfume is retained in an aqueous medium in a stable state. It can suitably be used for ballpoint pens, writing brush pens, felt-tip pens and markers.

What is claimed is:

1. A water based ink composition for a writing instrument comprising at least one of nonionic surfactants selected from the group consisting of a polyoxyethylene trimethylolpropane fatty acid ester, a polyoxyethylene sorbitan fatty acid ester, polyoxyethylene cholesteryl ether, a polyoxyethylene lanolin, a polyoxyethylene hardened castor oil, a polyoxyethylene hardened castor oil fatty acid ester and a polyoxyethylene fatty acid amide and further comprising a colorant, a perfume and water.

2. The water based ink composition for a writing instrument as described in claim 1, wherein the nonionic surfactant is a polyoxyethylene trimethylolpropane fatty acid ester.

3. The water based ink composition for a writing instrument as described in claim 1, wherein the nonionic surfactant is a polyoxyethylene sorbitan fatty acid ester.

4. The water based ink composition for a writing instrument as described in claim 1, wherein the nonionic surfactant is polyoxyethylene cholesteryl ether.

5. The water based ink composition for a writing instrument as described in claim 1, wherein the nonionic surfactant is a polyoxyethylene lanolin.

6. The water based ink composition for a writing instrument as described in claim 1, wherein the nonionic surfactant is a polyoxyethylene hardened castor oil.

7. The water based ink composition for a writing instrument as described in claim 1, wherein the nonionic surfactant is a polyoxyethylene hardened castor oil fatty acid ester.

8. The water based ink composition for a writing instrument as described in claim 1, wherein the nonionic surfactant is a polyoxyethylene fatty acid amide.

* * * * *

UNITED STATES PATENT AND TRADEMARK OFFICE
CERTIFICATE OF CORRECTION

PATENT NO.   : 6,776,829 B2
DATED        : August 17, 2004
INVENTOR(S)  : Masaru Miyamoto et al.

It is certified that error appears in the above-identified patent and that said Letters Patent is hereby corrected as shown below:

Title page,
Item [30], Foreign Application Priority Data, insert
-- Jun. 1, 2000 (JP) ........................... 2000-164960 --

Signed and Sealed this

First Day of February, 2005

JON W. DUDAS
*Director of the United States Patent and Trademark Office*